(12) United States Patent
Rottmoser et al.

(10) Patent No.: US 12,015,206 B2
(45) Date of Patent: Jun. 18, 2024

(54) MOBILE RADIO ANTENNA FOR CONNECTION TO AT LEAST ONE MOBILE BASE STATION

(71) Applicant: Telefonaktiebolaget LM Ericsson (publ), Stockholm (SE)

(72) Inventors: Franz Rottmoser, Schechen (DE); Christoph Staita, Oberaudorf (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 354 days.

(21) Appl. No.: 17/298,738

(22) PCT Filed: Nov. 29, 2019

(86) PCT No.: PCT/EP2019/083185
§ 371 (c)(1),
(2) Date: Jun. 1, 2021

(87) PCT Pub. No.: WO2020/109606
PCT Pub. Date: Jun. 4, 2020

(65) Prior Publication Data
US 2022/0059949 A1    Feb. 24, 2022

(30) Foreign Application Priority Data

Nov. 30, 2018    (DE) ............... 10 2018 130 570.2

(51) Int. Cl.
*H01Q 21/08*    (2006.01)
*H01P 1/18*    (2006.01)
(Continued)

(52) U.S. Cl.
CPC ............ *H01Q 21/08* (2013.01); *H01Q 1/246* (2013.01); *H01Q 1/32* (2013.01); *H01Q 3/32* (2013.01);
(Continued)

(58) Field of Classification Search
CPC .... H04B 1/005; H04B 1/0057; H04B 1/0064; H04B 1/38; H04B 1/40; H01Q 1/12;
(Continued)

(56) References Cited

U.S. PATENT DOCUMENTS 6,661,374 B2 * 12/2003 Kim .................. H01Q 3/24
342/368
7,450,066 B2 * 11/2008 Haskell .............. H01Q 1/246
455/562.1
(Continued)

FOREIGN PATENT DOCUMENTS

DE    102014000964 A1    7/2015
EP    1544938 A1    6/2005
KR    101790627 B1    10/2017

OTHER PUBLICATIONS

International Search Report and Written Opinion for International Patent Application No. PCT/EP2019/083185, mailed Feb. 17, 2020, 12 pages.
(Continued)

*Primary Examiner* — Quochien B Vuong
(74) *Attorney, Agent, or Firm* — Withrow & Terranova, PLLC

(57) ABSTRACT

A mobile radio antenna for connection to at least one mobile base station. The mobile radio antenna comprises a plurality of radiating elements and an antenna array module, which comprises at least a first housing module. The first housing module comprises a first receiving space and a second receiving space, which are separated from each other by at least one partition. A first phase shifter arrangement is situated in the first receiving space. A first duplex filter assembly is situated in the second receiving space. The at least one partition comprises a first opening, wherein a common terminal of the first duplex filter assembly is electrically or electromagnetically connected to a common (Continued)

terminal of the first phase shifter arrangement through the first opening. Furthermore, an antenna-side terminal of the first phase shifter arrangement is electrically connected directly or indirectly to a first terminal of at least one radiating element.

20 Claims, 14 Drawing Sheets

(51) Int. Cl.

| | | |
|---|---|---|
| *H01Q 1/24* | (2006.01) | |
| *H01Q 1/32* | (2006.01) | |
| *H01Q 3/32* | (2006.01) | |
| *H01Q 5/20* | (2015.01) | |
| *H04B 1/00* | (2006.01) | |
| *H04B 1/40* | (2015.01) | |
| *H01P 1/213* | (2006.01) | |

(52) U.S. Cl.
CPC ............... *H01Q 5/20* (2015.01); *H04B 1/005* (2013.01); *H01P 1/184* (2013.01); *H01P 1/2133* (2013.01)

(58) Field of Classification Search
CPC ...... H01Q 1/1214; H01Q 1/125; H01Q 1/246; H01Q 1/32; H01Q 3/30; H01Q 3/32; H01Q 5/20; H01Q 5/30; H01Q 21/08; H01Q 1/24; H01P 1/18; H01P 1/205
See application file for complete search history.

(56) References Cited

U.S. PATENT DOCUMENTS

| | | | |
|---|---|---|---|
| 8,391,377 B2 * | 3/2013 | Zhu | H04B 7/0617 |
| | | | 375/259 |
| 9,431,703 B1 | 8/2016 | Dandlberger et al. | |
| 11,452,173 B2 * | 9/2022 | Kumar | H04B 7/024 |
| 2014/0213322 A1 | 7/2014 | Pu et al. | |
| 2016/0359239 A1 | 12/2016 | Kurk et al. | |
| 2019/0074602 A1 | 3/2019 | Kurk et al. | |

OTHER PUBLICATIONS

Office Action for German Patent Application No. 102018130570.2, mailed Nov. 12, 2019, 10 pages.

* cited by examiner

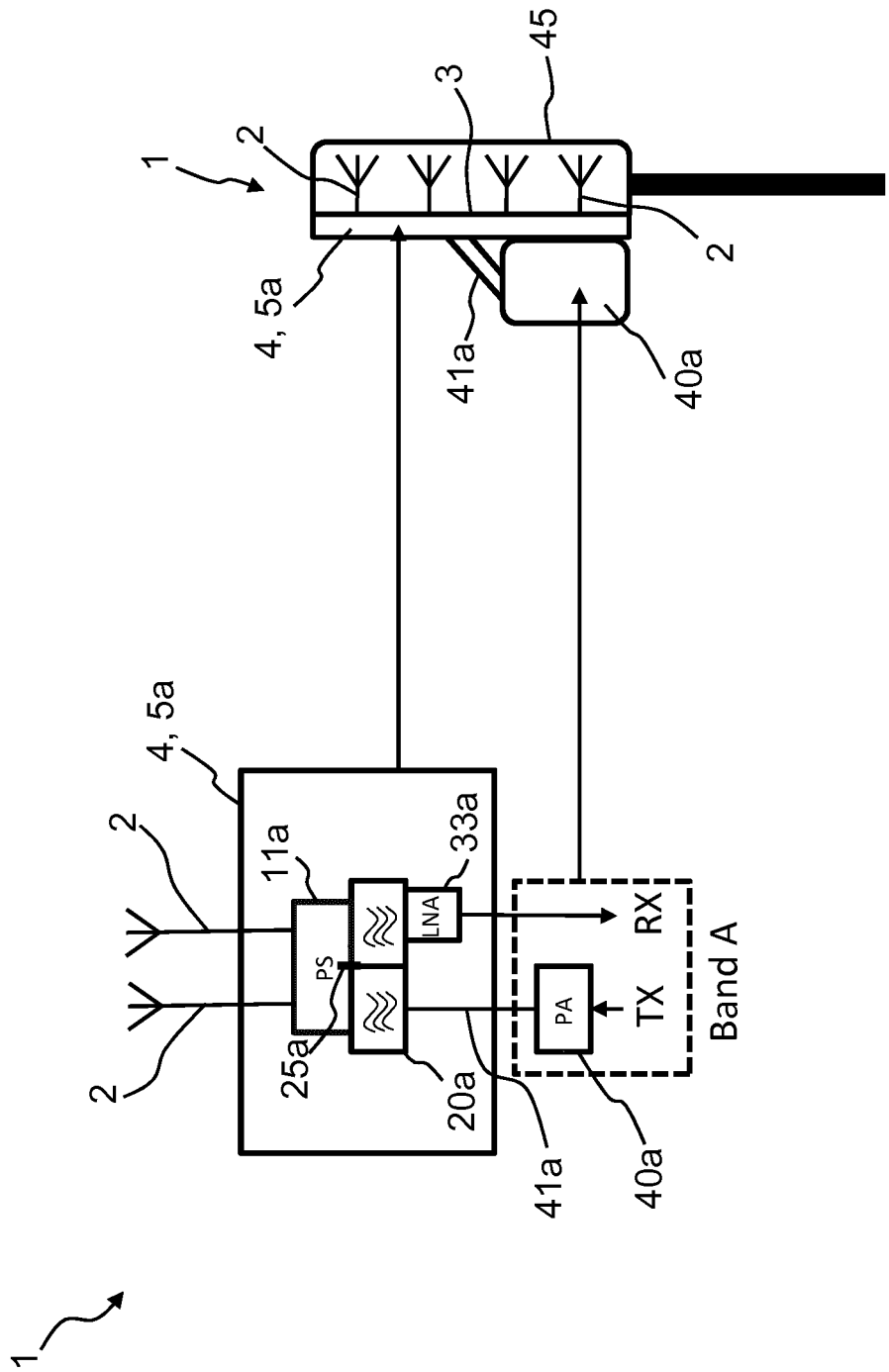

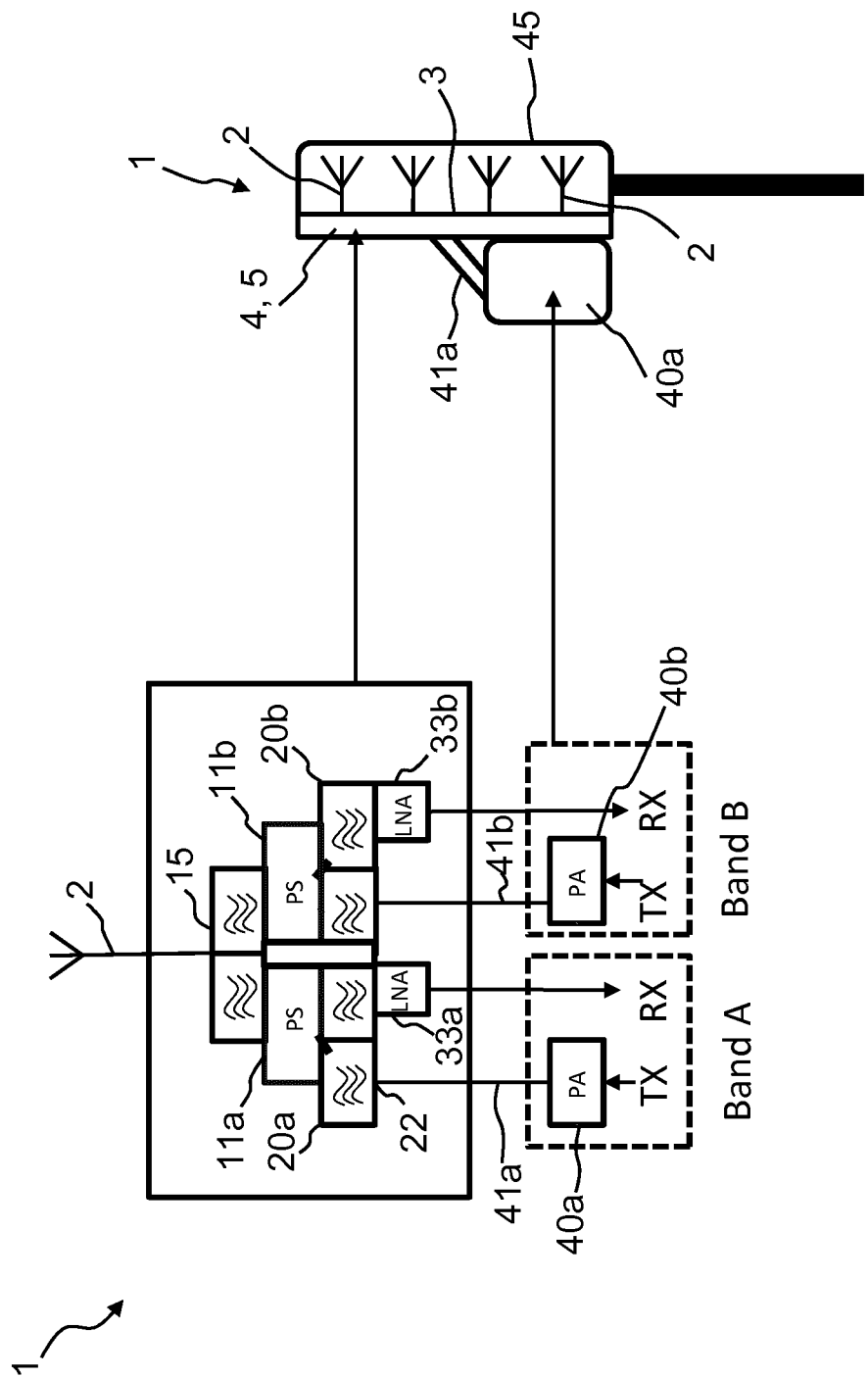

MOBILE RADIO ANTENNA FOR CONNECTION TO AT LEAST ONE MOBILE BASE STATION

This application is a 35 U.S.C. § 371 national phase filing of International Application No. PCT/EP2019/083185, filed Nov. 29, 2019, which claims the benefit of German Patent Application No. DE 10 2018 130 570.2, filed Nov. 30, 2018, the disclosures of which are incorporated herein by reference in their entireties.

The invention relates to a mobile radio antenna for connection to at least one mobile base station.

Such mobile radio antennas need to support many frequency bands at present and they serve for providing different mobile radio standards. Therefore, one also tries to integrate increasingly many components in the antenna housing. The problem, of course, is the passive intermodulation products (PIM) which arise and the concomitant worsening signal to noise ratio (SNR).

Figures 13A, 13B:
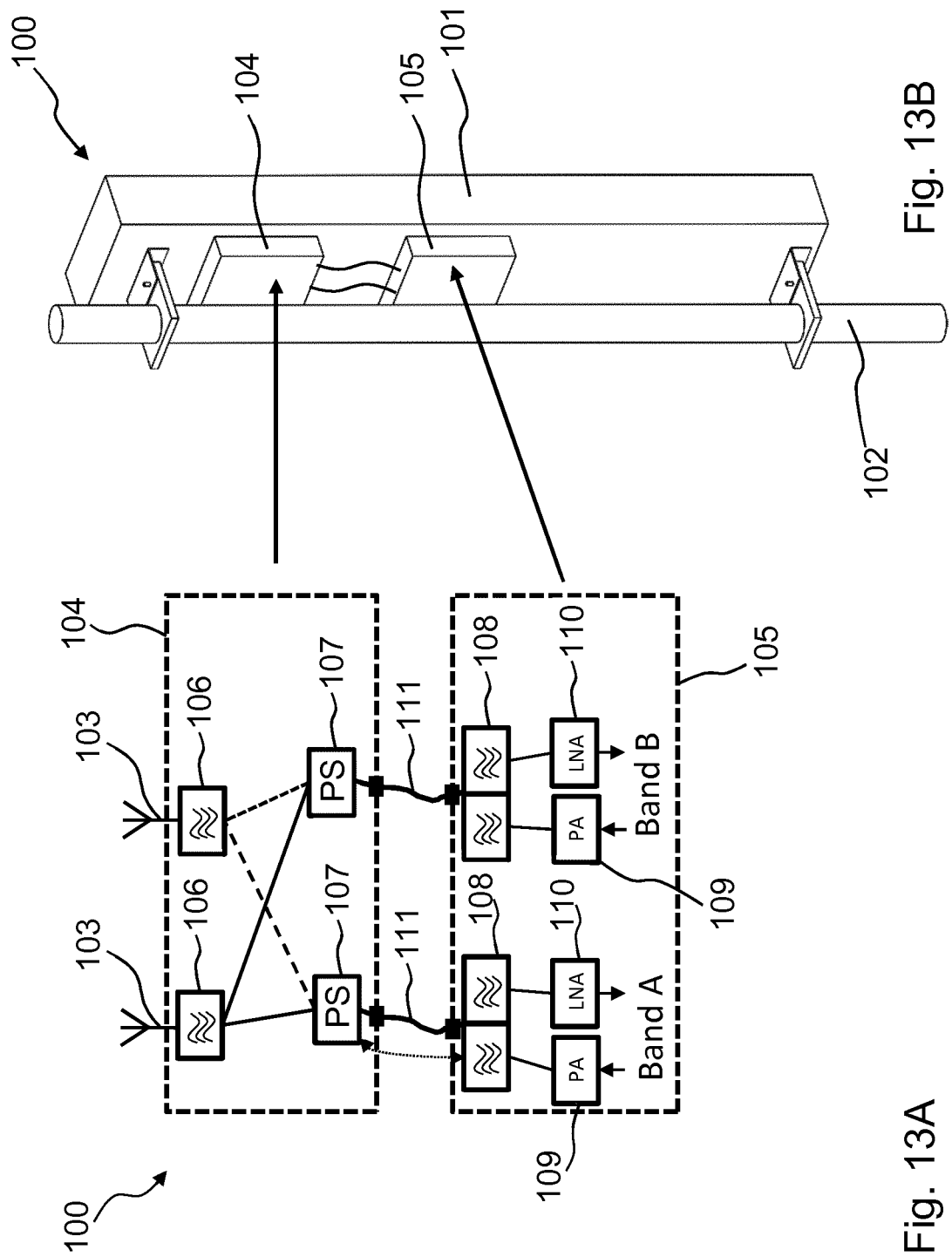

FIGS. 13A and 13B describe an exemplary antenna system from the prior art. The antenna system 100 comprises an antenna housing 101, which is mounted on an antenna mast 102. In the antenna housing 101 there are arranged various antennas 103. Furthermore, there are an antenna module 104 and a radio module 105. The antenna module 104 in this case contains a corresponding filter 106 and phase shifter 107. The radio module 105 likewise contains a filter 108 and an amplifier, including a power amplifier 109 and a LNA (Low-Noise Amplifier) 110.

The antenna module 104 is arranged on the outside of the antenna housing 101. The same also holds for the radio module 105, which is likewise arranged on the outside of the antenna housing 101, separate from the antenna module 104.

Due to the many plug connectors, the signal to noise ratio as well as the efficiency of the overall system or the transmission system are worsened. At the same time, both the transmit signal and the receive signal are transferred across a common cable connection 111. This common cable connection 111 connects the antenna module 104 to the radio module 105.

Therefore, the problem which the present invention proposes to solve is to create a mobile radio antenna for connection to at least one mobile base station that has improved electrical properties as compared to those in the prior art. This includes in particular an improved signal to noise ratio and an improved system efficiency.

The problem is solved by the mobile radio antenna according to the invention for connection to at least one mobile base station according to claim 1. In the dependent claims, modifications of the mobile radio antenna according to the invention are given.

The mobile radio antenna according to the invention for connection to at least one mobile base station comprises a plurality of radiating elements and a carrier assembly. The carrier assembly may consist of a single carrier or multiple interconnected individual carriers, which may also comprise circuit boards, for example. The plurality of radiating elements are arranged at or on a first side of the carrier assembly and are adapted to sending and receiving mobile radio signals in at least a first mobile radio band. Furthermore, there is provided an antenna array module, arranged on a second side of the carrier assembly. This second side is situated opposite the first side. The antenna array module comprises at least a first housing module. The first housing module comprises a first receiving space. This is bounded by side walls and a housing bottom, and it is open toward one side. The first housing module furthermore comprises a second receiving space, which is likewise bounded by side walls and a housing bottom and it is open toward one side. The receiving spaces may then be closed with a corresponding cover assembly. The first and second receiving space are separated from each other by at least one partition. This partition is formed in particular by a side wall or the housing bottom. A first phase shifter arrangement is situated in the first receiving space. This comprises a common terminal and a plurality of antenna-side terminals. Each antenna-side terminal of the phase shifter arrangement is electrically connected directly or indirectly to a first terminal of at least one radiating element. A first duplex filter assembly is situated in the second receiving space. This furthermore comprises a common terminal and a first TX terminal and a first RX terminal. The at least one partition comprises a first opening, wherein the common terminal of the first duplex filter assembly is electrically or electromagnetically connected to the common terminal of the first phase shifter arrangement through the first opening. In an "electrical connection", a conductor (e.g., in the form of a wire) in particular is led through and is connected in turn galvanically to the first phase shifter arrangement and galvanically to a least a portion of the first duplex filter assembly. The first duplex filter assembly has a damping/transmission function, which ensures that transmit signals of a transmission band in the at least one first mobile radio band can be transmitted (almost) without attenuation from the TX terminal to the common terminal. It furthermore makes sure that receive signals of a reception band in the at least one first mobile radio band can be transmitted (almost) without attenuation from the common terminal to the RX terminal. On the other hand, the damping/transmission function also ensures that transmit signals in the at least one first mobile radio band are heavily attenuated from the TX terminal to the RX terminal and that receive signals in the at least one first mobile radio band are likewise heavily attenuated from the common terminal to the TX terminal in order to avoid interference for the receiver. Furthermore, it is ensured that neighbouring bands area also not disturbed and that the interference of neighbouring bands is suppressed. A corresponding blocking attenuation to which these signals can then be subjected is preferably greater than 15 dB, 20 dB, 25 dB, 30 dB and further preferably greater than 33 dB, 34 dB or greater than 35 dB. The phrase "(almost) unattenuated" means an attenuation of preferably less than 3 dB, 2 dB, 1 dB or less than 0.5 dB.

It is especially advantageous that the mobile radio antenna according to the invention, being preferably an active mobile radio antenna, comprises a housing module, which contains both the phase shifter arrangement and the duplex filter assembly. Thanks to these being arranged in a common housing, the connection between the duplex filter assembly and the phase shifter arrangement is very short, in particular, a corresponding partition only needs to have an opening. Long cable connection joining two separate housings and corresponding plug connectors can be omitted. This decreases the PIM and the signal to noise ratio increases. Power losses are minimized. The efficiency of the mobile radio antenna as well as the efficiency of the overall system are improved. The electrical properties of the mobile radio antenna according to the invention are improved.

The term "for connection" should be taken to mean that the mobile radio antenna is connected by a cable connection directly to a base station, or that the mobile radio antenna is connected wirelessly, e.g., by a directional radio link. A cable connection may also comprise an optical cable (such as a glass fibre cable).

In one preferred embodiment, the at least one first housing module is a single piece. This means that the side walls and the housing bottom, which bound the first receiving space and the second receiving space, are joined together. This involves an integrally bonded connection. Preferably, at least the first housing module is a diecast (aluminium) part and/or a milled part. The first housing module with its side walls and its housing bottom preferably consists of a metal or a metal alloy. The use of a plastic, provided with an electrically conductive layer, would also be conceivable.

In one preferred modification, the first housing module further comprises a third receiving space, which is likewise bounded by side walls and a housing bottom. The second and the third receiving space are separated from each other by at least a further partition. There is provided a first low-noise amplifier (LNA) in the third receiving space. The at least one further partition in turn comprises an opening, wherein the first LNA is electrically connected by this opening to the RX terminal of the first duplex filter assembly. It is especially advantageous for the first LNA to likewise be arranged directly in the first housing module. This avoids transmitting the transmit signal, already amplified by a power amplifier, and the not yet amplified receive signal through a common cable. Because the LNA is arranged directly in the first housing module, the amplified receive signals are also transmitted via such a common cable. The receive signal is thus amplified at the earliest possible point in the signal chain and the signal to noise ratio is optimized (or a worsening of the signal to noise ratio is minimized). All of the following connections/connection cables are supplied with the amplified receive signal.

In one preferred embodiment, there is likewise provided a first power amplifier, which of course is situated outside the antenna array module and thus outside the first. It is electrically connected by a cable connection to the first TX terminal of the first duplex filter assembly.

A radome furthermore covers the plurality of radiating elements. The at least one first power amplifier is arranged interchangeably on the mobile radio antenna, such that a replacement of the at least one first power amplifier can be done without disassembly of the antenna array module or the radome. This reduces the down time and the mobile radio antenna does not need to be dismounted from the antenna mast in order to replace the power amplifier, which is subject to a very high stress and therefore has a shorter lifetime than the LNA.

The antenna array module with the first housing module can likewise be arranged inside the radome.

In one preferred modification of the mobile radio antenna according to the invention, the first duplex filter assembly has a cavity design. Basically, it may also comprise ceramic resonators or strip conductors, which are arranged for example on a circuit board or a metal sheet.

In a special modification of the mobile radio antenna according to the invention, at least a second mobile radio band is further supported. For this, there is provided at least a second phase shifter arrangement, situated in the first receiving space. This in turn comprises a common terminal and a plurality of antenna-side terminals. There is furthermore provided a second duplex filter assembly, situated in the second receiving space. This in turn comprises a common terminal and a first TX terminal and a first RX terminal. It is important that the first and the at least one second duplex filter assembly are decoupled from each other. There is likewise provided a diplex filter assembly situated in the first receiving space. The diplex filter assembly comprises a plurality of antenna-side terminals, wherein each antenna-side terminal is electrically connected to a respective first terminal of at least one radiating element. The diplex filter assembly comprises a plurality of first terminals, wherein each antenna-side terminal of the first phase shifter arrangement is electrically connected to a respective first terminal of the diplex filter assembly. The diplex filter assembly comprises a plurality of second terminals, each antenna-side terminal of the second phase shifter arrangement being electrically connected to a respective second terminal of the diplex filter assembly. The diplex filter assembly is adapted to put out mobile radio signals, which are supplied to the respective first and the respective second terminal, to the respective antenna-side terminal. At the same time, the at least one first diplex filter assembly is adapted to separate the mobile radio signals which are received at the respective antenna-side terminal in the respective mobile radio band and put them out at the respective first or the respective second terminal.

For this, the diplex filter assembly comprises a plurality of diplex filter modules. Each diplex filter module is preferably arranged on a separate circuit board or is a separate subassembly and comprises an antenna-side terminal, a first terminal, and a second terminal. Between every two diplex filter modules there is arranged a wall segment, which is an integral component of the housing bottom and extends from the latter into the first receiving space and is electrically conducting.

Preferably the first housing module likewise comprises a fourth receiving space, which is bounded in turn by side walls and a housing bottom. The second and the fourth receiving space are likewise separated from each other by an additional partition. There is arranged a second low-noise amplifier (LNA) in the fourth receiving space. The additional partition in turn comprises an opening, through which the second LNA is electrically connected to the first RX terminal of the second duplex filter assembly. This provides the corresponding benefits of the invention (high signal to noise ratio) also for the transmission of the second mobile radio band. The plurality of radiating elements are broadband radiators and are adapted to sending and receiving mobile radio signals in at least two non-overlapping mobile radio bands. For example, the radiating elements can be operated in the mobile radio bands 1, 3 and 7. The mobile radio band 1 (e.g., for LTE) in Europe is situated in a frequency range of 2110-2170 MHz for the transmit signals and in a frequency range of 1920-1980 MHz for the receive signals. The mobile radio band 3 in Europe, Asia and the USA is situated in the range of 1710-1785 MHz for the transmit signals and in the range of 1805-1880 MHz for the receive signals. The mobile radio band 7 in Europe, Asia and Canada is situated in the range of 2500 MHz-2570 MHz for the send signals and in the range of 2620 MHz-2690 MHz for the receive signals.

A scaling of the mobile radio antenna according to the invention for more than two mobile radio bands would be possible with no problem. In this case, there would be yet another duplex filter assembly and another phase shifter arrangement. The diplex filter assembly would then comprise at least three mobile radio bands or would divide a common signal into at least three mobile radio bands.

Especially preferably, the first and the second receiving space of the first housing module are accessible through opposite sides of the first housing module. In this case, the at least one partition is formed by the housing bottom of the first housing module. Therefore, the two receiving spaces have the same housing bottom. A corresponding coupling of the two receiving spaces, i.e., a connection between the common terminal of the first phase shifter arrangement and the common terminal of the first duplex filter assembly, then occurs via an opening in the housing bottom.

It would also be possible for the two receiving spaces to be accessible from the same side. In this case, the partition would be formed an one side wall of the first housing module, which bounds the first and the second receiving space on one side.

In order to support further polarisation, the antenna array module in a preferred embodiment comprises a second housing module as well. This second housing module comprises a first receiving space and a second receiving space, respectively bounded by corresponding side walls and a housing bottom. The two receiving spaces are separated from each other by at least one partition. Furthermore, a first phase shifter arrangement and a first duplex filter assembly are situated in the first and second receiving space, respectively. The at least one partition comprises in turn a first opening, wherein the common terminal of the first duplex filter assembly is electrically or electromagnetically connected to the common terminal of the first phase shifter arrangement through this first opening.

The plurality of radiating elements are designed to send and receive mobile radio signals in two polarisation planes. A first polarisation of the mobile radio signal can be established and received at the first terminal of the plurality of radiating elements and a second polarisation of the mobile radio signal can be established and received at the second terminal of the plurality of radiating elements. The mobile radio signals are preferably orthogonally polarized (+/−45°). An elliptical or a circular polarisation would likewise be conceivable. It may therefore be said that the plurality of radiating elements are dual polarized.

In order to support further mobile radio bands or applications, the necessary additional radiators can be arranged in additional columns situated parallel to each other. The further columns are oriented vertically to the bottom. The additional radiators in the further columns may be connected via further antenna array modules. In a mobile radio antenna according to the invention, therefore, more than two antenna array modules may also be installed.

In one preferred embodiment, an adjusting device (RET unit) is further provided. This is adapted to move the at least one first phase shifter arrangement of the first housing module and the at least one first phase shifter arrangement of the second housing module relative to each other in synchronized manner. This can occur, for example, via a corresponding gear arrangement.

The first phase shifter arrangement is preferably constructed by means of a difference phase shifter. A linear phase shifter would likewise be conceivable. The first housing module and the second housing module are likewise preferably single pieces (integrally bonded connection) and further preferably are made in a common (aluminium) diecasting process and/or milling procedure.

Figure 2:
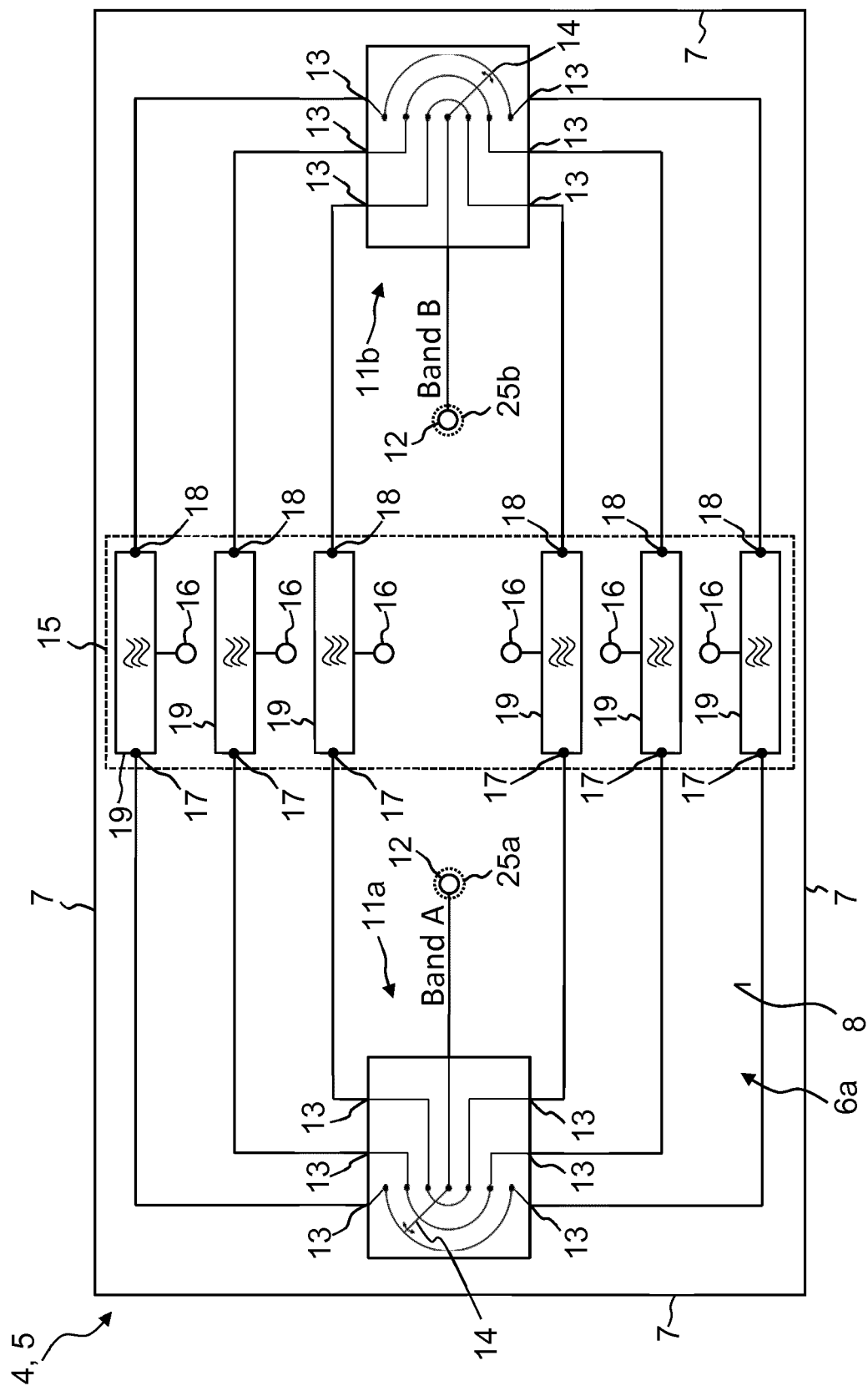
Figure 3:
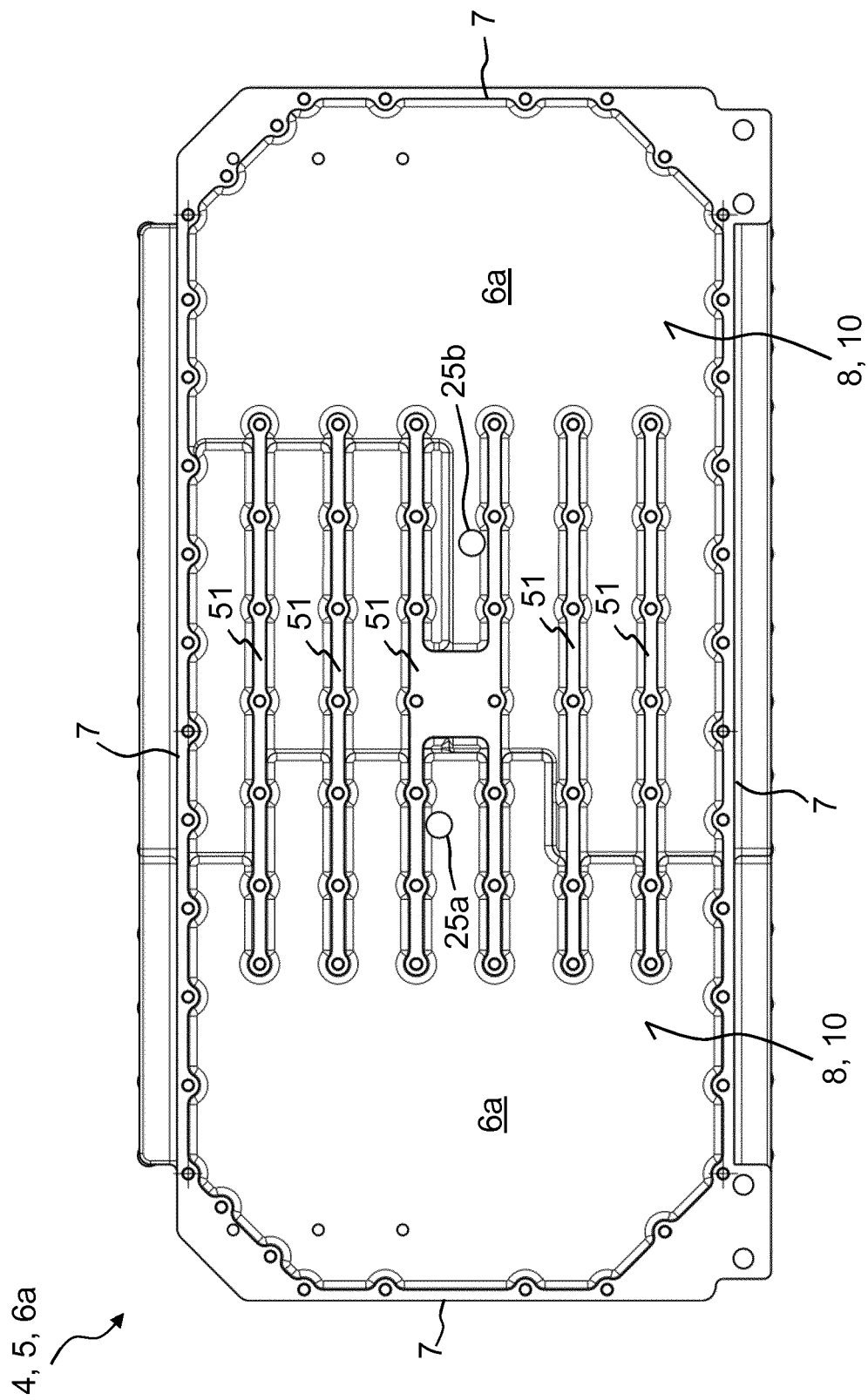
Figure 4:
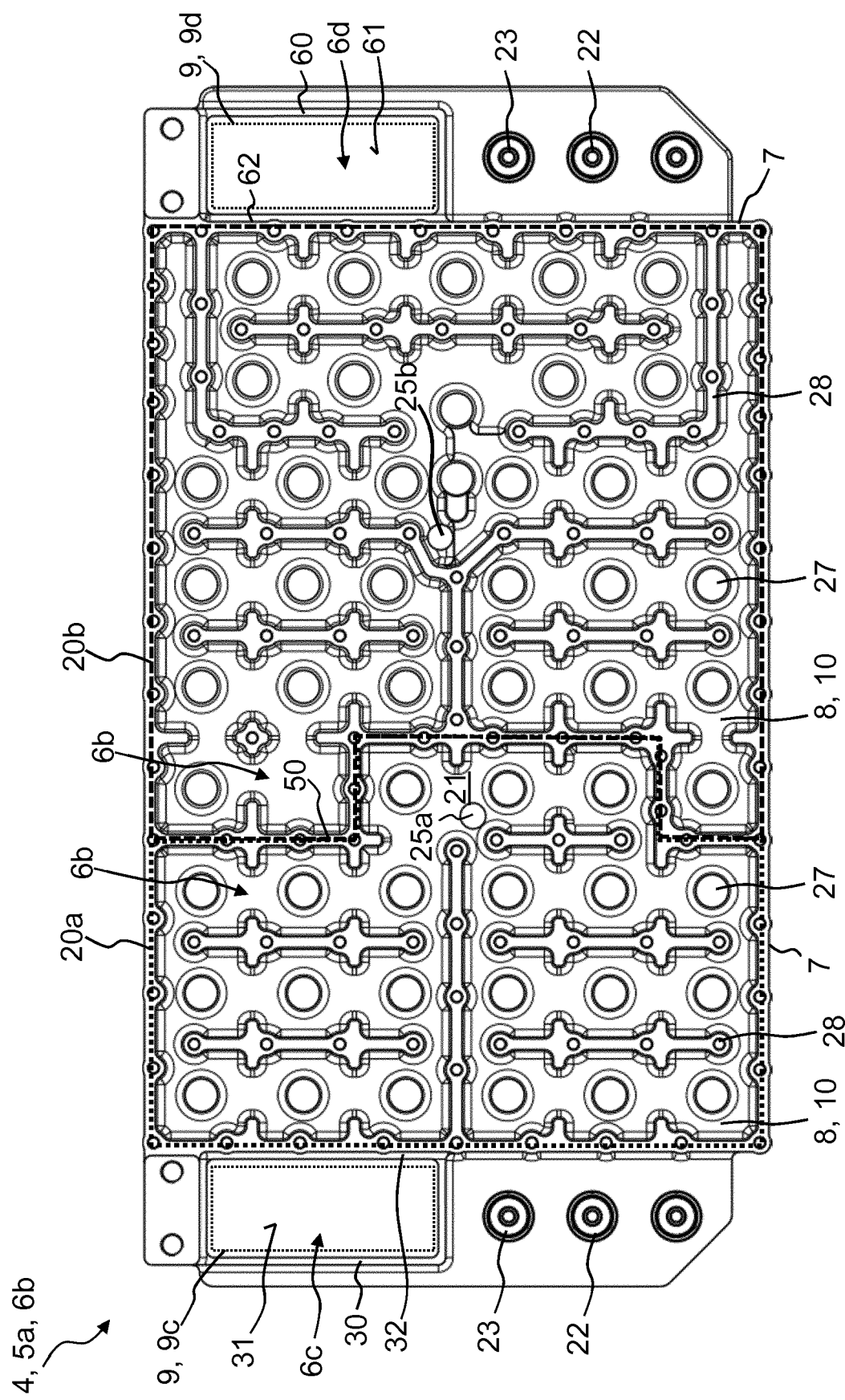
Figure 5:
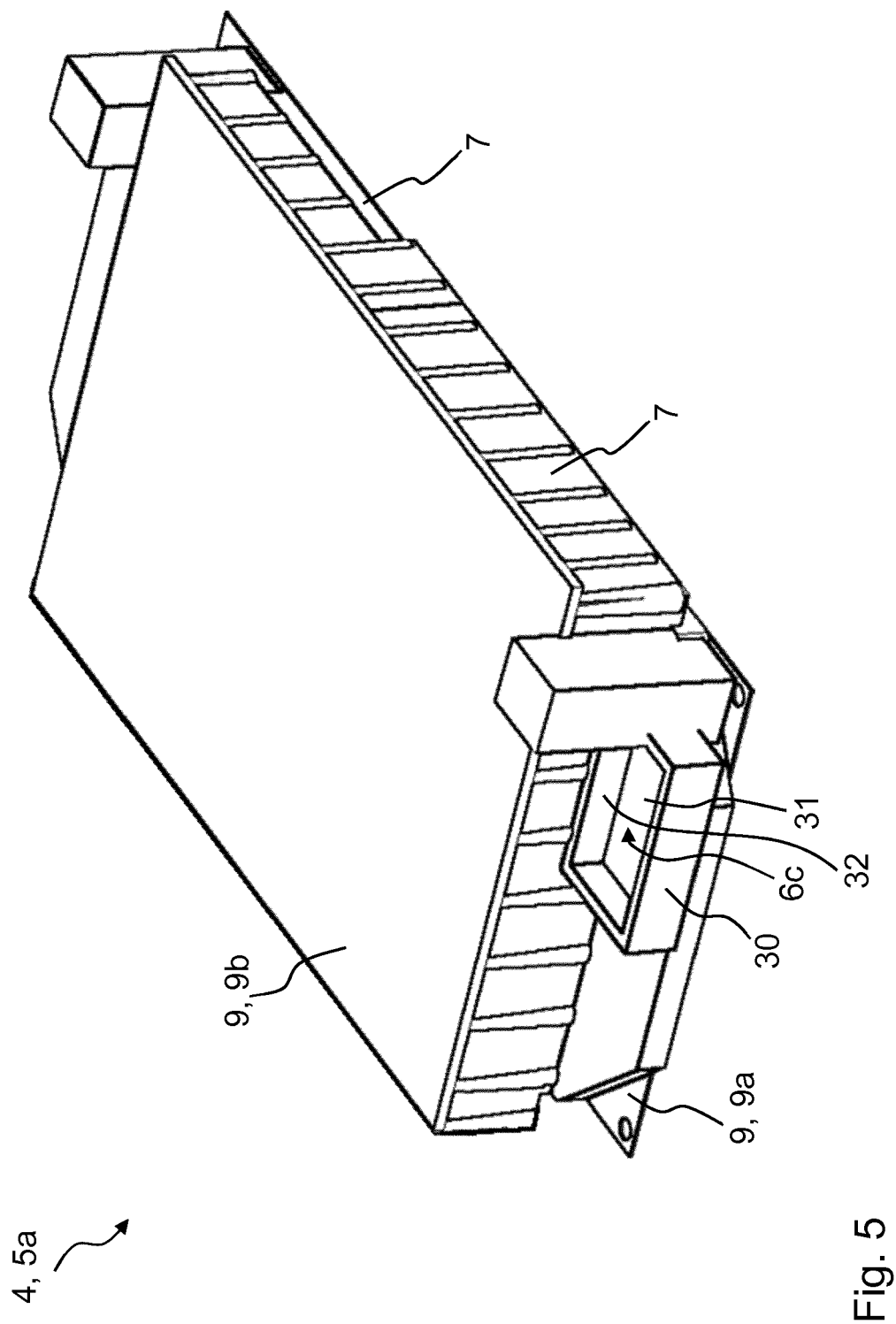
Figure 6:
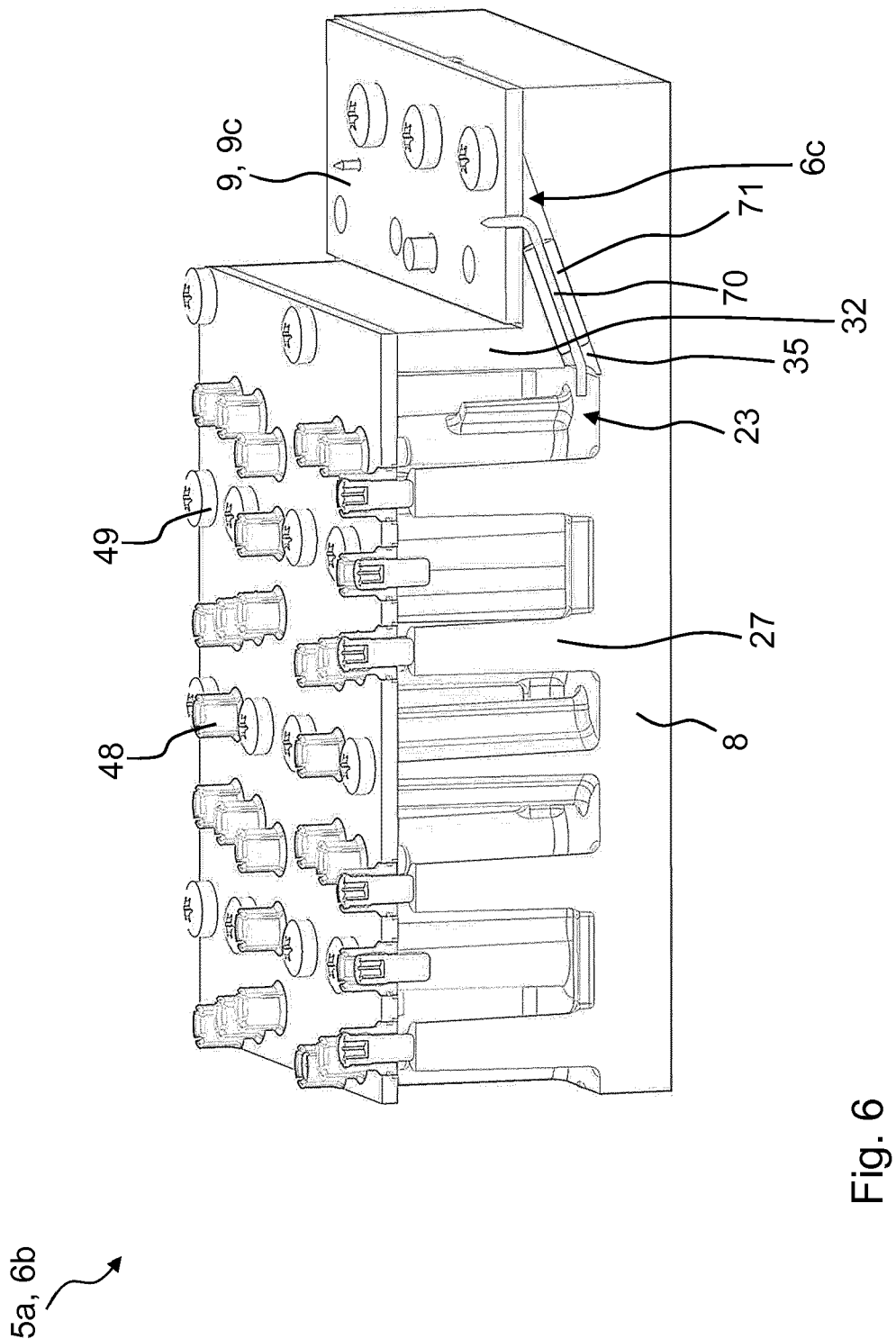
Figure 7:
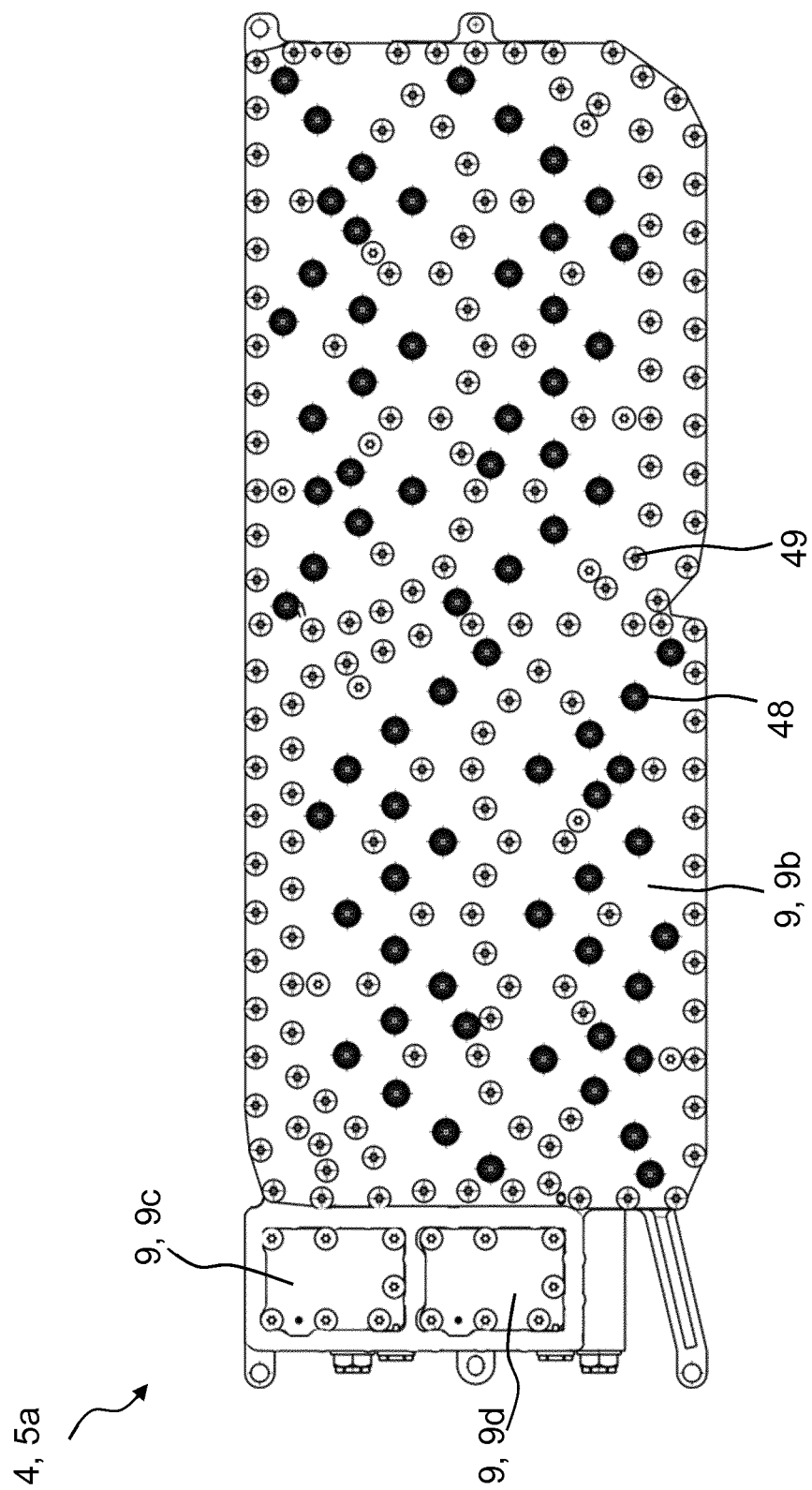
Figure 8:
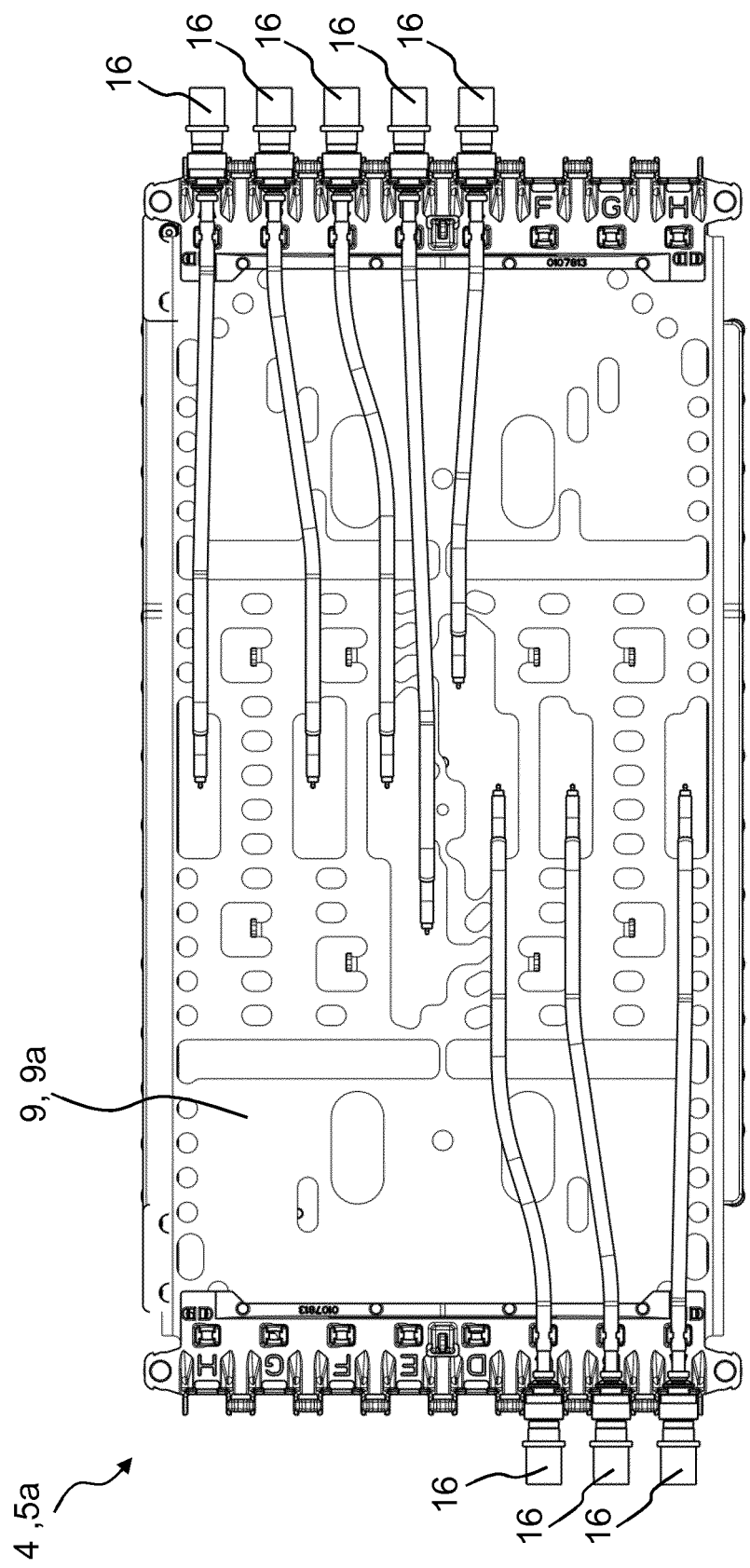
Figure 9:
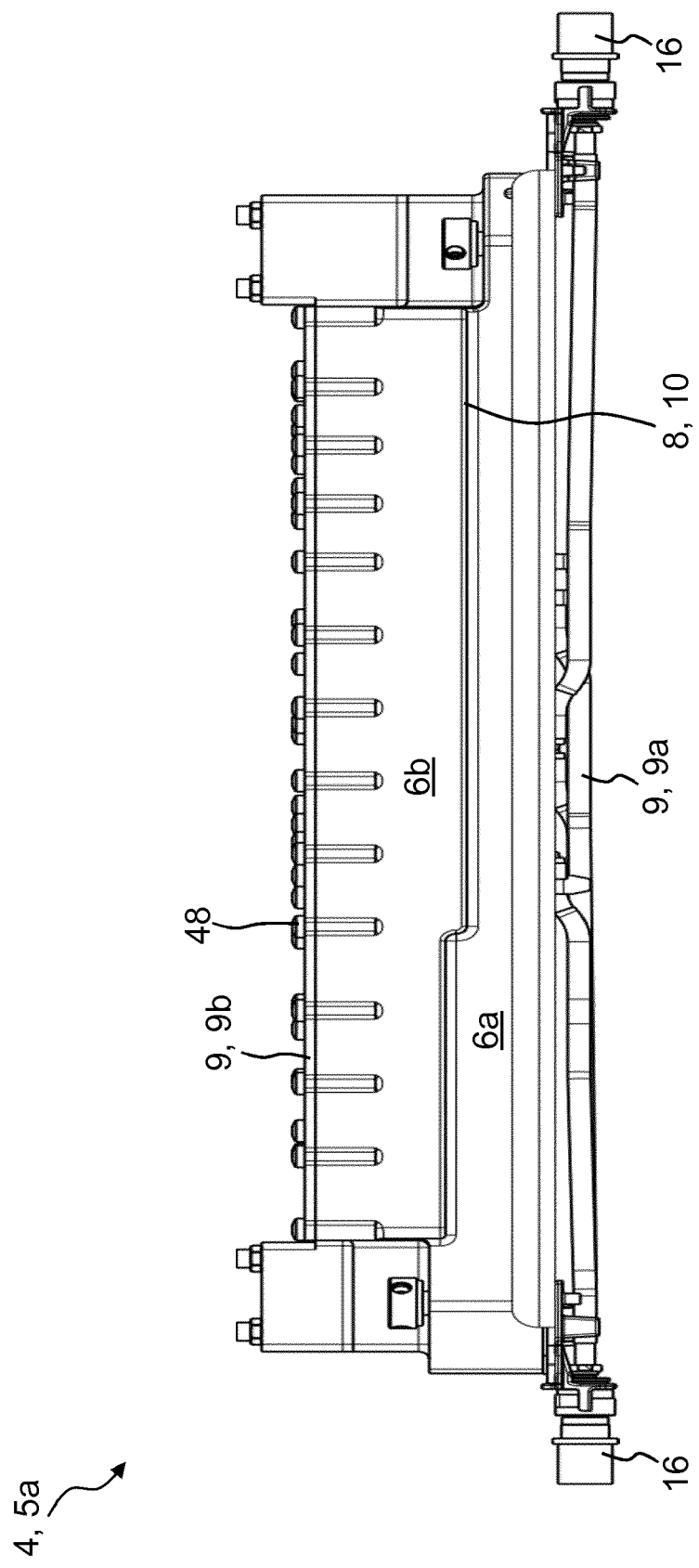
Figure 10:
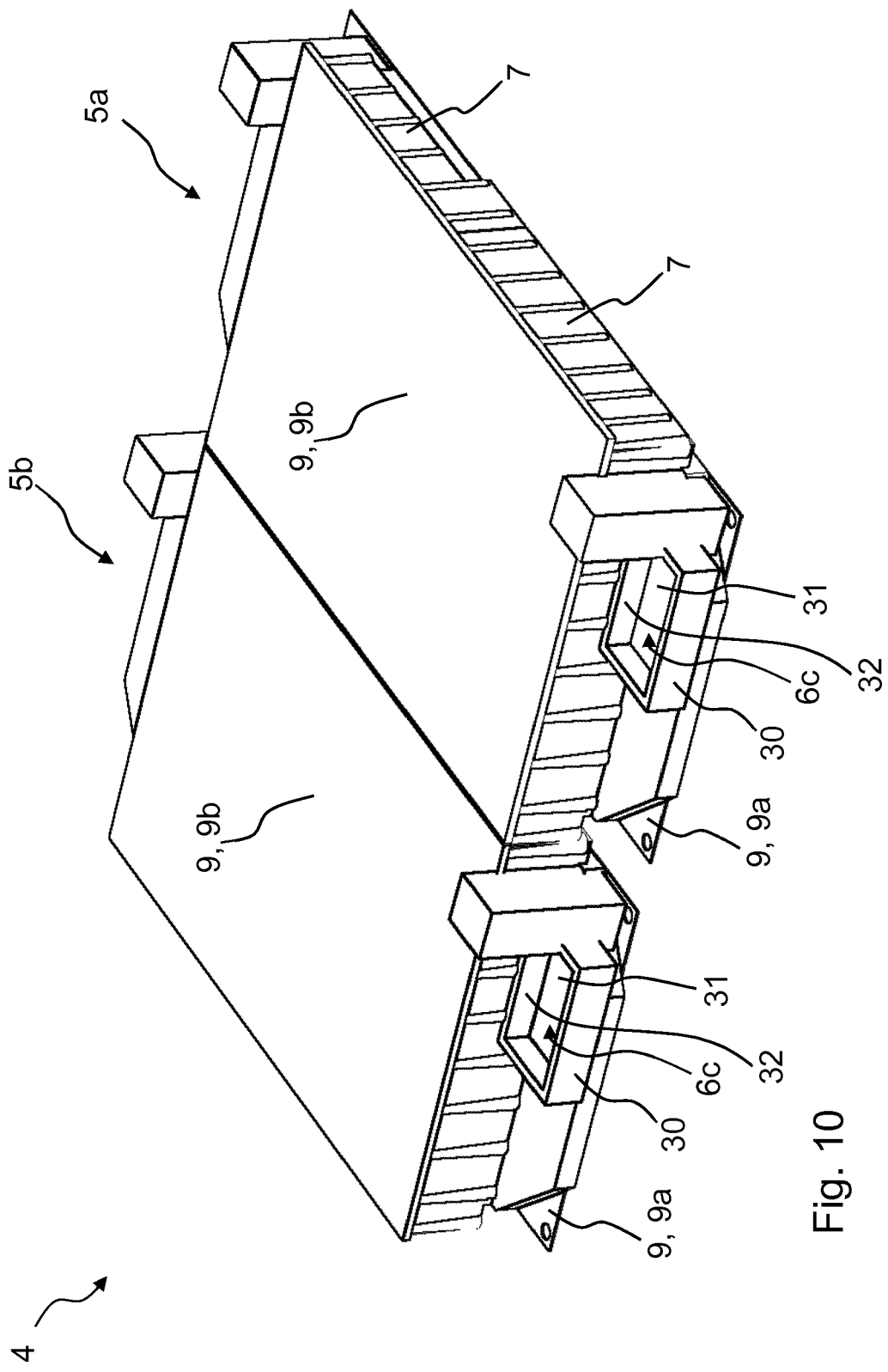
Figure 11:
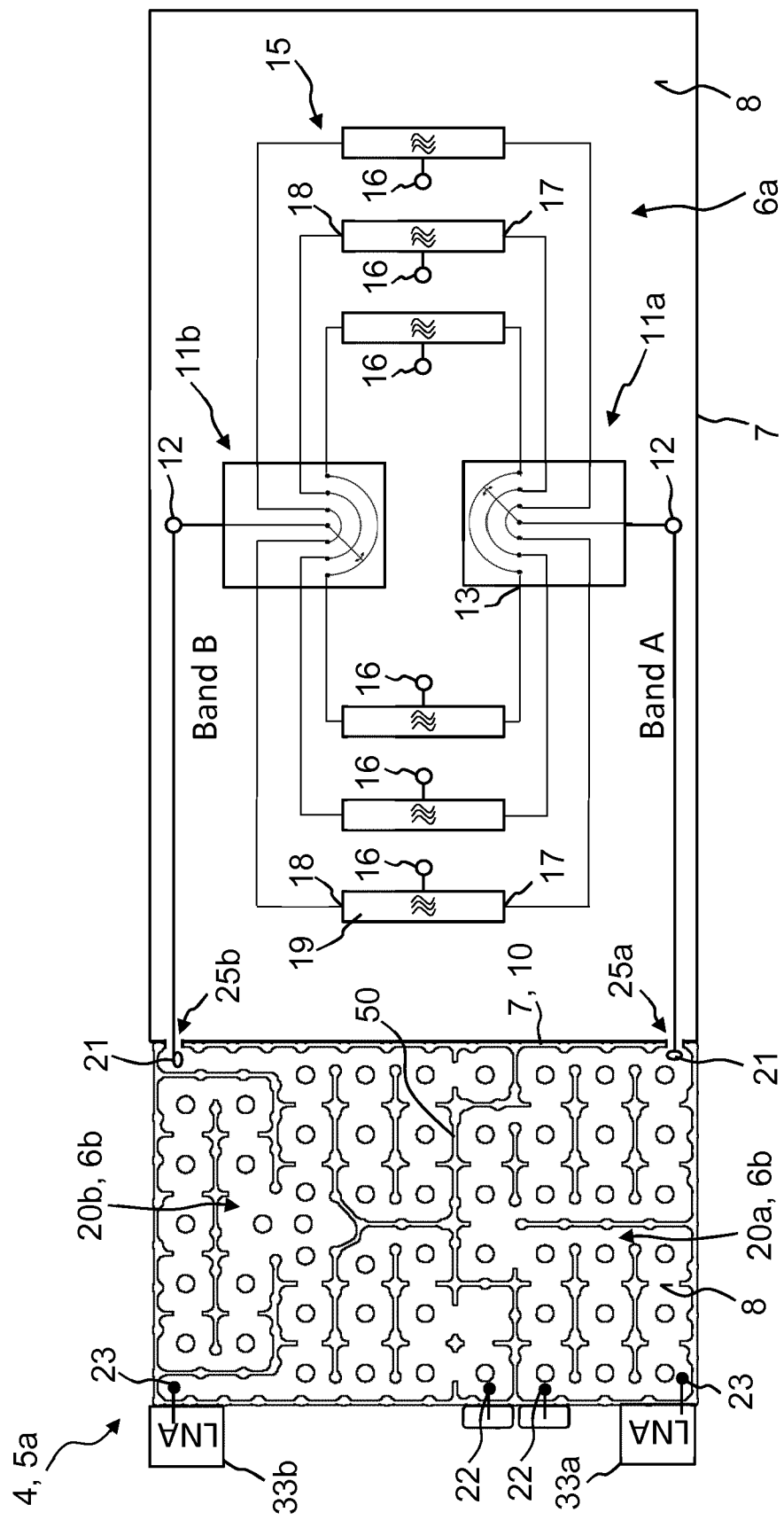
Figure 12:
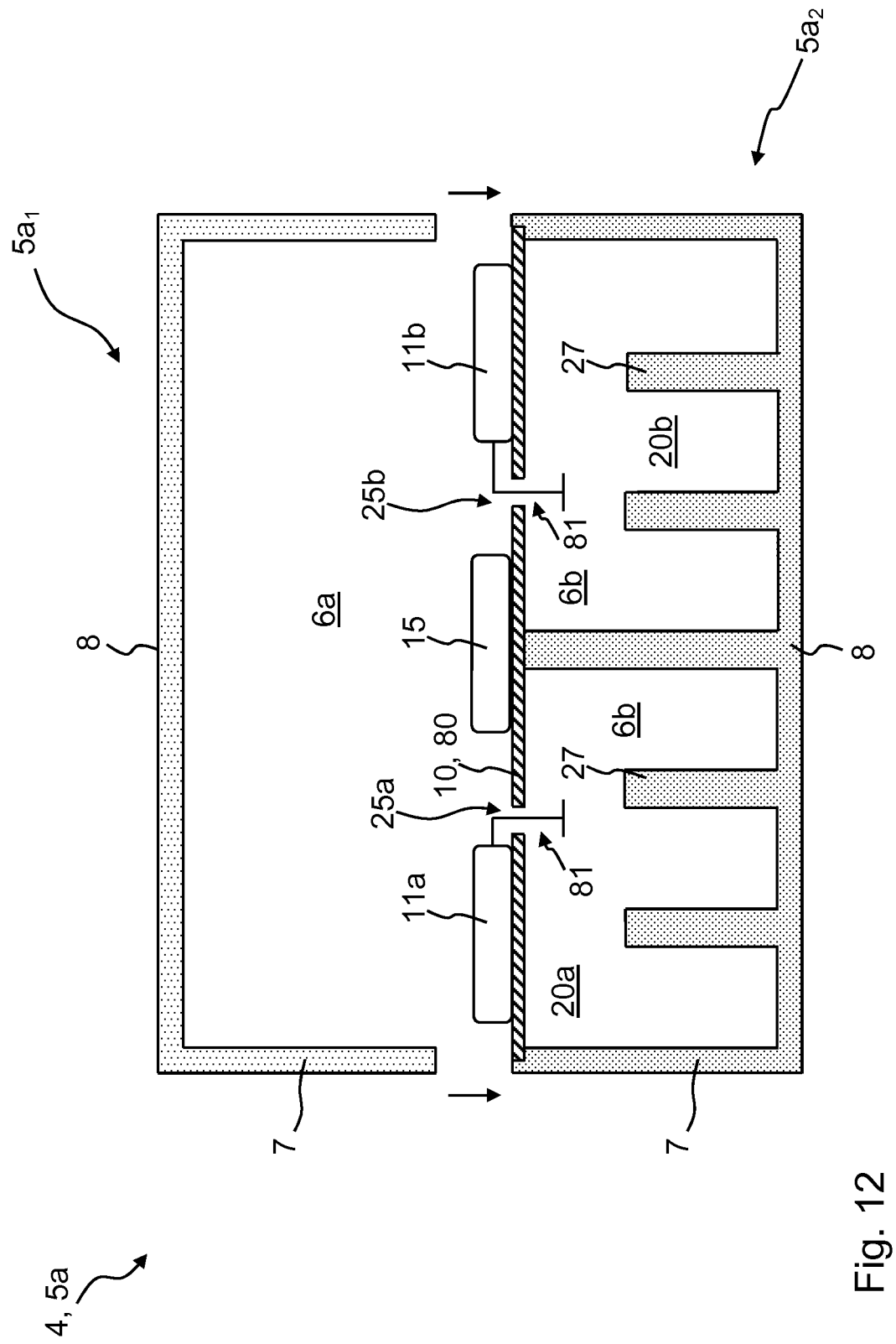

Various exemplary embodiments of the invention shall now be described as examples with reference to the drawings. The same objects have the same reference numbers. The corresponding figures of the drawing show specifically:

FIGS. 1A and 1B: a mobile radio antenna according to the invention for a mobile radio band;

FIGS. 1C and 1D: a mobile radio antenna according to the invention for multiple mobile radio bands;

FIG. 2: a first and a second phase shifter arrangement and a first diplex filter assembly;

FIG. 3: a first receiving space of a first housing module to receive the first and a second phase shifter arrangement and the first diplex filter assembly;

FIG. 4: a second receiving space of a first housing module to receive a first duplex filter assembly;

FIG. 5: a spatial view of the first housing module;

FIG. 6: a sectional spatial view of the first housing module through a portion of the second and third receiving spaces;

FIG. 7: a top view of a closed second, third and fourth receiving space of the first housing module;

FIG. 8: a top view of the closed first receiving space of the first housing module with corresponding antenna-side terminals of the first diplex filter assembly;

FIG. 9: a side view of the first housing module;

FIG. 10: a spatial view of the first and a second housing module;

FIG. 11: a top view of an exemplary embodiment according to the invention of a first housing module, in which the first receiving space and the second receiving space are accessible from the same side; and FIG. 12: a broad exemplary embodiment according to the invention of the antenna array module where the first housing module is composed of two housing halves;

FIGS. 13A, 13B: a mobile radio antenna of the prior art.

FIGS. 1A and 1B show a mobile radio antenna 1 according to the invention for a (first) mobile radio band A. FIGS. 1C and 1D on the other hand show an expansion of the mobile radio antenna 1 according to the invention for the operation of multiple, especially a first and a second mobile radio band A, B. The mobile radio antenna 1 according to FIGS. 1A and 1B comprises at least a plurality of radiating elements 2, which are arranged on a first side of a carrier assembly 3. These radiating elements 2 are preferably broadband radiators, which are adapted to send and receive mobile radio signals in at least two, non-overlapping mobile radio bands A, B. These radiating elements 2 may also be dual polarized.

There is furthermore provided an antenna array module 4, which is arranged on a second side of the carrier assembly 3. The antenna array module 4 comprises at least a first housing module 5a.

This first housing module 5a is shown for example in FIG. 5. It comprises a first receiving space 6a and second receiving space 6b. The first receiving space 6a can be seen for example in FIGS. 3 and 9 and the second receiving space 6b in FIGS. 4 and 9. The first receiving space 6a according to FIG. 3 is bounded by side walls 7 and a housing bottom 8. The same also holds for the second receiving space 6b. This also is bounded by side walls 7 and a housing bottom 8. FIG. 5 further shows a cover assembly 9. The cover assembly 9 in this case consists of several cover segments 9a, 9b. A first cover segment 9a serving to close the first receiving space 6a and a second cover segment 9b serving to close the second receiving space 6b.

The first and the second receiving space 6a, 6b may be arranged on top of one another per FIG. 9. This means that the first and the second receiving space 6a, 6b of the first housing module 5a are accessible through opposite sides of the first housing module 5a.

The first and the second receiving space 6a, 6b are moreover separated from each other by at least one partition 10. In FIG. 9, where the first and the second receiving space 6a, 6b are arranged on top of one another (the distance of the individual receiving spaces 6a, 6b from the second side of the carrier assembly is therefore different), the at least one partition 10 is the housing bottom 8.

In regard to FIG. 11, on the other hand, the first and the second receiving space 6a, 6b of the first housing module 5a are accessible from the same side of the first housing module 5a. The at least one partition 10 is therefore formed by a side wall 7 of the first housing module 5a. This side wall 7 bounds both the first and the second receiving space 6a, 6b on one side.

FIG. 1A furthermore shows at least a first phase shifter arrangement 11a. This is situated in the first receiving space 6a. The first phase shifter arrangement 11a may be, per FIG. 2, a difference phase shifter 11a. A lengthwise movable phase shifter could also be used. The at least one first phase shifter arrangement 11a comprises a common terminal 12 and multiple antenna-side terminals 13. By rotating a collector element 14, a send signal supplied to the common terminal is present in different phase position at the individual multiple antenna-side terminals 13. Such a difference phase shifter is known for example from DE 10 2015 006 622 B3, whose contents are referenced herein with regard to the construction of the difference phase shifter.

Each antenna-side terminal 13 of the first phase shifter arrangement 11a may be electrically connected directly or indirectly to a first terminal of at least one radiating element. By a "direct connection" is meant the direct connection of the antenna-side terminals 13 to the first terminal of the respective radiating element 2. Such a direct connection is represented in FIG. 1A. Usually, however, the mobile radio antenna 1 according to the invention supports multiple mobile radio bands A, B, so that the antenna-side terminals 13 of the first phase shifter arrangement are only connected "indirectly" across a diplex filter assembly 15 (see FIG. 1C) to the at least one first terminal of the respective radiating element 2.

Each antenna-side terminal 13 of the first phase shifter arrangement 10a can be connected directly or indirectly to a first terminal of precisely one radiating element 2 or to a first terminal of a group of radiating elements 2, the group of radiating elements 2 comprising a plurality of radiating elements 2. In this case, multiple radiating elements 2 would send out the same transmit signal (same frequency and phase position). This may be advantageous for a MIMO operation.

FIG. 1A furthermore shows at least a first duplex filter assembly 20a. This is situated in the second receiving space 6b. The first duplex filter assembly 20a comprises a common terminal 21 and a first TX terminal 22 and a first RX terminal 23. Refer here to FIGS. 4 and 11. The at least one partition 10, which may be a side wall 7 (FIG. 11) or the housing bottom 8 (FIG. 4), comprises a first opening 25a, the common terminal 21 of the first duplex filter assembly 20a being electrically or electromagnetically connected to the common terminal 12 of the first phase shifter arrangement 10a through the first opening 25a. By an "electrical connection" is meant in particular a galvanic connection. An "electromagnetic connection" involves a signal transmission with the aid of electromagnetic waves.

The first duplex filter assembly 20a has a damping/transmission function, which passes through transmit signals of a transmission band in the at least one first mobile radio band A from the first TX terminal 22 to the common terminal 21 (non-attenuated). Furthermore, receive signals of a reception band in the at least one first mobile radio band A are passed through from the common terminal 21 to the first RX terminal 23 (non-attenuated). On the contrary, transmit signals in the at least one first mobile radio band A from the first TX terminal 22 to the first RX terminal 23 are damped with a blocking attenuation. The same holds for receive signals in the at least one first mobile radio band A from the common terminal 21 to the first TX terminal 22. The first duplex filter assembly 20a also preferably fulfils yet other criteria. Thus, a spectral purity is achieved up to 12.75 GHz. This means that harmonics of the at least one first power amplifier 40a at the common terminal 21 lie below a given threshold value. The harmonics in particular are damped with more than 30 dB.

In regard to FIG. 5 it can be seen that the first housing module 5a (except for the cover assembly 9) is constructed as a single piece. This holds for the side walls 7 and the housing bottom 8, which enclose the first receiving space 6a. The same also holds for the side walls 7 and the housing bottom 8 which enclose the second receiving space 6b. On the whole, the side walls 7 and the housing bottom 8 are all made as a single piece. This means that the side walls 7 and the housing bottom 8 enter into an integrally bonded connection with each other. In particular, they are made from a diecast (aluminium) part and/or a milled part.

The first housing module 5a per FIG. 5 comprises yet a third receiving space 6c, which in turn is enclosed by side walls 30 and a housing bottom 31. The second and the third receiving space 6b, 6c are separated from each other by at least one further partition 32. There is provided a first low-noise amplifier (LNA) 33a, which is arranged in the third receiving space 6c. The at least one further partition 32 comprises an opening 35 (see FIG. 6), and the first LNA 33a is electrically connected through this opening 35 to the first RX terminal 23 of the first duplex filter assembly 20a. The at least one further partition 32 in this instance is a side wall 7 of the first housing module 5a, which encloses the second receiving space 6b. The side walls 30 which enclose the third receiving space 6c preferably prolong the first housing module 5a in (at least) one direction. The cover assembly 9 comprises a further cover segment 9c by which the third receiving space 6c is closed (see FIGS. 4, 6 and 7). The mobile radio antenna 1 furthermore comprises preferably a first power amplifier 40a (see FIG. 1A). The at least one first power amplifier 40a is arranged outside the antenna array module 4 and the first housing module 5a. The first power amplifier 40a is electrically connected by a cable connection 41a to the TX terminal 22 of the first duplex filter assembly 20a.

According to FIG. 1B, the radiating elements 2 are covered by a radome 45. The at least one first power amplifier 40a is secured interchangeably on the mobile radio antenna 1 or on the carrier assembly 3 so that a replacement of the at least one first power amplifier 40a can be done without disassembly of the antenna array module 4 or the radome 45. The at least one first power amplifier 40a is preferably arranged outside the radome 45, especially in its own weatherproof housing and preferably secured to the second side of the carrier assembly 3. In this weatherproof housing, there may also be arranged at least one A/D converter and/or at least one D/A converter besides the first power amplifier 40a. Furthermore, additional components for the digital signal processing and/or signal conditioning may also be accommodated here. Further preferably, the at least one first power amplifier 40a can be connected by a screwless quick release to a corresponding plug element and released from it.

The at least one first duplex filter assembly 20a is a cavity design. Refer to FIG. 4 for this. Individual resonator inner conductors 27 are arranged galvanically (especially as a single piece) on the housing bottom 8 and extend from this in the direction of the cover assembly 9, not shown. They end at a distance from the cover assembly 9 or are galvanically disconnected from it. Between the individual resonator inner conductors 27 there may further be arranged additional wall segments 28, so that the visual contact between individual resonator inner conductors 27 is restricted and a direct coupling is not possible, or only to a reduced extent. These wall segments 28 are also preferably made as a single piece with the housing bottom 8 (integral bonding). FIG. 4 likewise shows the first opening 25a in the at least one partition 10, which in this case is formed by the housing bottom 8. Through this at least one first opening 25a in the present instance the common terminal 21 of the first duplex filter assembly 20a is connected to the common terminal 12 of the first phase shifter arrangement 11a. This first opening 25a may be, for example, a plain borehole.

The at least one first duplex filter assembly 20a, shown by dotted lines in FIG. 4, could basically also be formed by ceramic resonators or by strip conductors, the latter being arranged on a circuit board or on a metal sheet. A second duplex filter assembly 20b, to be discussed further below, is shown by dashed lines.

FIG. 7 shows the second segment 9b of the cover assembly 9, which closes the second receiving space 6b. Shown in black are a plurality of tuning elements 48, which can preferably be screwed into and out from the second receiving space 6b by a thread. In this way, the resonance frequencies of the individual resonators formed by the resonator inner conductors 27 can be tuned. Corresponding screw connections 49 ensure that the second cover segment 9b of the cover assembly 9 lies firmly, especially high-frequency tight, against the first housing module 5a and closes the second receiving space 6b.

It is not shown that the first duplex filter assembly 20a further comprises at least one additional (second) TX terminal and/or at least one additional (second) RX terminal. In this case, it would be possible to amplify the transmission band of the first mobile radio band A by different power amplifiers 40a. The same may also apply to the reception band of the first mobile radio band A, which could also be amplified by multiple LNAs 33. Each power amplifier 40a or each LNA 33a would amplify a partial band region of the transmission band or the reception band.

Alternatively, it would also be possible for the first duplex assembly 20a to support multiple (cohesive) mobile radio bands A, B. In this case, transmit signals of different mobile radio bands A, B would be supplied to the first and the at least one second TX terminal 22. Receive signals of different mobile radio bands A, B could be obtained from the first and the at least one second RX terminal 23. The different mobile radio bands A, B are then merged at the common terminal 21.

FIGS. 1C and 1D further show that the mobile radio antenna 1 according to the invention further supports at least one second mobile radio band B. The two mobile radio bands A, B preferably do not overlap each other.

For this reason, yet another second phase shifter arrangement 11b is provided, being arranged in the first receiving space 6a in which the first phase shifter arrangement 11a is also arranged. The second phase shifter arrangement 11b likewise comprises a common terminal 12 and multiple antenna-side terminals 13 (see FIG. 2).

There is furthermore provided at least one second duplex filter assembly 20b, arranged in the second receiving space 6b. The second duplex filter assembly 20b likewise comprises a common terminal 21, a first TX terminal 22 and a first RX terminal 23 (see FIG. 11). In FIGS. 4 and 11 one can moreover see that the first and the second duplex filter assembly 20a, 20b, which have a cavity design, are decoupled from each other. This is achieved by a corresponding wall 50. This wall has no openings.

For the damping/transmission function of the at least one second duplex filter assembly 20b, what was already described about the first duplex filter assembly 20a also applies. Basically, even more duplex filter assemblies could also be present, if the mobile radio antenna 1 according to the invention is supposed to support further mobile radio bands.

In regard to FIG. 1C, there is furthermore provided at least one diplex filter assembly 15. This is likewise situated in the first receiving space 6a of the first and second phase shifter arrangement 11a, 11b.

The at least one diplex filter assembly 15 comprises a plurality of antenna-side terminals 16 (see FIG. 2). Each antenna-side terminal 16 of the diplex filter assembly 15 is electrically connected to a first terminal of at least one radiating element 2. The diplex filter assembly 15 furthermore comprises a plurality of first terminals 17, each antenna-side terminal 13 of the first phase shifter arrangement 11a being electrically connected to a respective first terminal 17 of the diplex filter assembly 15. The diplex filter assembly 15 furthermore comprises a plurality of second terminals 18. Each antenna-side terminal 13 of the second phase shifter arrangement 11b is electrically connected to a respective second terminal 18 of the diplex filter assembly 15. The diplex filter assembly 15 has a damping/transmission function, so that mobile radio signals in the at least one first mobile radio band A are passed through from the antenna-side terminals 16 to the plurality of first terminals 17. At the same time, mobile radio signals in the at least one second mobile radio band B are passed through from the antenna-side terminals 16 to the plurality of second terminals 18. On the other hand, mobile radio signals in the at least one first mobile radio band A from the antenna-side terminals 16 or the plurality of first terminals 17 to the plurality of second terminals 18 are subjected to a (high) blocking attenuation. The same also holds for mobile radio signals in at least one second mobile radio band B, which are subjected to a (high) blocking attenuation from the antenna-side terminals 16 or the plurality of second terminals 18 to the plurality of first terminals 17. The phrase "(high) blocking attenuation" is to be understood to mean that the respective mobile radio signal is dampened with more than 15 dB, 20 dB, 25 dB, 30 dB, 32 dB, 33 dB, 34 dB or more than 35 dB. But the damping is preferably less than 50 dB or 40 dB.

FIG. 3 shows the second receiving space 6a. The at least one first diplex filter assembly 15 is arranged at the centre of the receiving space 6a and thus in particular between the two phase shifters 11a, 11b.

According to FIG. 2, the diplex filter assembly 15 comprises a plurality of diplex filter modules 19. Each diplex filter module 19 is preferably arranged on a separate circuit board and comprises an antenna-side terminal 16, a first terminal 17 and a second terminal 18. Between every two diplex filter modules 19 there is arranged per FIG. 3 a wall segment 51, which extends away from the housing bottom 8 of the first receiving space 6a (in the direction of the cover assembly 9, 9a) and is electrically conducting. Basically, it would also be possible for the individual circuit boards to be joined together at their ends, so that a common circuit board assembly can be used. The first and the second phase shifter arrangement 11a, 11b could likewise be at least partly a component of this common circuit board assembly.

The common circuit board assembly would then have recesses between two diplex filter modules 19, through which the respective wall segments 51 extend. The first and the second phase shifter arrangement 11a, 11b respectively comprise a phase shifter, the non-moving parts of the respective phase shifter of the first and the second phase shifter arrangement 11a, 11b being situated on the common circuit board assembly. The rotatable collector element 14 is preferably situated above the common circuit board assembly (but stands in capacitive or galvanic contact with parts of the common circuit board assembly).

FIG. 3 likewise shows the first opening 25a (in the bottom assembly 8) through which the common terminal 12 of the first phase shifter arrangement 11a is electrically or electromagnetically connected or coupled to the common terminal 21 of the first duplex filter assembly 20a.

The partition 10, which in this exemplary embodiment involves the housing bottom 8, further comprises a second opening 25b, the common terminal 21 of the second duplex filter assembly 20b being electrically or electromagnetically connected or coupled to the common terminal 12 of the second phase shifter arrangement 11b through the second opening 25b.

In order to strengthen the coupling, a wire can also be led through the respective first or second opening 25a, 25b. This may be soldered for example to the first or second phase shifter arrangement 11a, 11b. This wire could also be soldered directly to a resonator inner conductor 27 of the first or second duplex filter assembly 20a, 20b.

The wire is preferably spaced apart and led without contact from the first housing module 5a. For this, a corresponding spacer sleeve made of plastic can be used, which is inserted into the respective opening 25a, 25b through which the wire is led. Such a spacer sleeve is shown form the connection of the first LNA 33a in FIG. 6. It is given there the reference number 71. The plastic of which the spacer sleeve is made should have low dielectrical losses for the particular frequency range.

FIG. 11 shows the first and the second phase shifter arrangement 11a, 11b situated at the centre of the first receiving space 6a and surrounded at least on two sides by the plurality of diplex filter modules 19 of the diplex filter assembly 15. A connection from the respective common terminal 12 of the first and second phase shifter arrangement 11a, 11b to the corresponding common terminal 21 of the first or second duplex filter assembly 20a, 20b runs in this instance with a component predominantly or exclusively horizontal, i.e., parallel to the cover assembly 9, through the respective first or second opening 25a, 25b.

FIG. 4 further shows that the first housing module also comprises a fourth receiving space 6d, which in turn is bounded by side walls 60 and a housing bottom 61. Also refer here to FIG. 7, where the third and fourth receiving space 6c, 6d are situated on the same side of the first housing module 5a. On the other hand, the third and the fourth receiving space 6c, 6d in FIG. 4 are situated on opposite sides of the first housing module 5a. The second and the fourth receiving space 6b, 6d in turn are separated from each other by at least one additional partition 62. In this fourth receiving space 6d there is arranged a second LNA 33b. The at least one additional partition 62 in turn comprises an opening, by which the second LNA 33b is electrically connected to the first RX terminal 23 of the second duplex filter assembly 20b.

Such a connection is shown in FIG. 6 for the third receiving space 6c. By a connection line 70 the first LNA 33a is electrically or electromagnetically connected to the first RX terminal 23 of the first duplex filter assembly 20a.

The connection line 70 in this case is led through a spacer sleeve, so that no electrical contacting with the first housing module 5a can occur.

Furthermore, there is provided at least one second power amplifier 40b, which is likewise situated outside the antenna array module 4 and the first housing module 5a. By a cable connection 41b, this second power amplifier 40b is electrically connected to the first TX terminal 22 of the second duplex filter assembly 20b.

FIG. 8 shows a top view of the first receiving space 6a closed by the cover assembly 9 with the first cover segment 9a. The first cover segment 9a in this case involves a circuit board assembly, on which preferably the first and second phase shifter arrangement 11a, 11b and optionally also the diplex filter assembly 15 are situated. Likewise to be seen are the antenna-side terminals 16 of the diplex filter assembly 15. These are led by corresponding cables to the outside of the first housing module 5a.

In regard to FIG. 10, it shown that the antenna array module 4 comprises yet a second housing module 5b. The second housing module 5b is preferably built identical to the first housing module 5a. Thus, it likewise comprises a first and a second receiving space, there being provided in the first receiving space of the second housing module 5b once again a first phase shifter arrangement and in the second receiving space of the second housing module 5b a first duplex filter assembly. Through a first opening in the corresponding partition of the second housing module 5b, the common terminals of the first duplex filter assembly of the second housing module 5b and the first phase shifter arrangement of the second housing module 5b are electrically connected or coupled together.

The plurality of radiating elements 2 are adapted in particular to send and receive mobile radio signals in two polarisation planes. A first polarisation of the mobile radio signal can be established (transmit signal) and received (receive signal) at the first terminal of the plurality of radiating elements 2. A second polarisation of the mobile radio signal can be established (transmit signal) and received (receive signal) at the second terminal of the plurality of radiating elements 2.

By a first adjusting device, not shown, the respective first phase shifter arrangement 11a of the first housing module 5a and the respective first phase shifter arrangement of the second housing module 5b can be adjusted synchronously with respect to each other. The same also holds in the event that a second phase shifter arrangement is also provided.

The first adjusting device (RET unit) can preferably be actuated via AISG signals. Such AISG signals will be transmitted via the cable connection 41a. The voltage supply of the first adjusting device may likewise come via the cable connection 41a or via a separate power supply.

In FIG. 10, the first receiving space 6a of the first housing module 5a and the first receiving space of the second housing module 5b have the same side wall 7. This also holds for the second receiving space 6b of the first housing module 5a and the second receiving space of the second housing module 5b. The first housing module 5a and the second housing module 5b are formed as a single piece in this instance. In particular, the respective side walls and preferably also the respective bottom wall are joined together by integral bonding. Only the cover assembly 9 can consist of different cover segments 9a, 9b, so that each receiving space 6a, 6b is closed by a separate cover segment 9a, 9b.

In the event that the antenna array module 4 of the mobile radio antenna 1 according to the invention has a design per FIG. 11, the second housing module 5b would be situated beneath the first housing module 5a. This means that the first receiving space 6a of the first housing module 5a and the first receiving space of the second housing module 5b have the same housing bottom 8. The same also holds for the second receiving space 6b of the first housing module 5a and the second receiving space of the second housing module 5b. In this way, the antenna array module 4 can have an especially compact construction. Such an antenna array module 4 can also be tested extensively before the mobile radio antenna 1 is put together.

The first phase shifter arrangement 11a comprises a phase shifter. The phase shifter comprises the plurality of antenna-side terminals 13, while the phase shifter has a common input terminal. A signal change unit is provided, comprising the common terminal 12 and at least one first output terminal. The at least one first output terminal of the signal change unit is electrically connected to the common input terminal of the phase shifter.

The phase shifter of the first phase shifter arrangement 11a is a difference phase shifter or a linear phase shifter. In addition or alternatively, the signal change unit comprises a matching network and/or a power divider. The purpose of the matching network is to transform the input impedance of the phase shifter to a desired value.

If both a matching network and a power divider are present, then they are connected in series. The series sequence is arbitrary (matching network and then the power divider and then the phase shifter or power divider and then the matching network and then the phase shifter). The matching network has an input terminal and an output terminal. The power divider has an input terminal and two output terminals.

The mobile radio antenna 1 preferably comprises further additional radiating elements, the further additional radiating elements being arranged at the centre of the carrier assembly 3 on the side of the carrier assembly 3 with the mobile radio antenna 1 and being surrounded by the plurality of radiating elements 2. The power divider comprises at least a second output terminal. The at least one second output terminal of the power divider is electrically connected to a first terminal of the further additional radiating elements of the mobile radio antenna 1. This power divider branches off, e.g., 50% of the power and takes this portion directly to these further additional radiating elements (e.g., dipoles). The downtilt angle of the mobile radio antenna can be adjusted by the plurality of radiating elements 2 which are connected to the phase shifter.

FIG. 12 shows another exemplary embodiment of the mobile radio antenna 1 according to the invention in general and the antenna array module 4 in particular.

The housing module 5a comprises two housing halves $5a_1$, $5a_2$. A first housing half $5a_1$ comprises a housing bottom 8 and side walls 7, by which the first receiving space 6a is enclosed. A second housing half 5a2 comprises a housing bottom 8 and side walls 7, by which the second receiving space 6b is enclosed. The two housing halves $5a_1$, $5a_2$ are placed one on the other, so that the end faces of the side walls 7 of the two housing halves $5a_1$, $5a_2$ are oriented toward each other.

The first phase shifter arrangement 11a comprises a common circuit board assembly 80, wherein a first side of the common circuit board assembly 80 is covered predominantly or entirely with a metal layer. Likewise, the second phase shifter arrangement 11b and the diplex filter assembly 15 are also arranged on the common circuit board assembly 80. The common circuit board assembly 80 closes off the second receiving space 6b, the first side of the common circuit board assembly 80 pointing in the direction of the second receiving space 6b. The at least one partition 10 is formed by the metal layer of the second side of the common circuit board assembly 80, the first opening 25a passing through the common circuit board assembly. The same also holds for the second opening 25b. The coupling between the first or second phase shifter arrangement 11a, 11b and the first or second duplex filter assembly 20a, 20b is made either by an electromagnetic coupling or, as shown in FIG. 12, by a conductor 81. The first and second duplex filter assembly 20a, 20b are arranged in the second receiving space 6b.

In the first and/or second housing module 5a, 5b there may also be arranged power dividers (with any given division factor), test adapters (with corresponding signal output), cable terminals, distribution networks and/or LF or DC outputs (such as a BIAS Tee). A lightning arrester or voltage surge protector may also be arranged in the first or second housing module 5a, 5b. For this, even further receiver spaces can be provided.

Basically, the mobile radio antenna 1 according to the invention may comprise even further radiating elements, not connected to the antenna array module 4. These further radiating elements may for example support the 900 MHz band. These further radiating elements may be purely passive, supplied from an external radio or a base station.

The invention is not limited to the described exemplary embodiments. All described and/or drawn features may be combined with each other as desired in the scope of the invention.

The invention claimed is:

1. A mobile radio antenna for connection to at least one mobile base station, having the following characteristics:
   there are provided a plurality of radiating elements and a carrier assembly;
   the plurality of radiating elements are arranged on a first side of the carrier assembly and are adapted to sending and receiving mobile radio signals in at least a first mobile radio band;
   there is provided an antenna array module, arranged on a second side of the carrier assembly, the antenna array module comprising at least a first housing module;
   the first housing module comprises a first receiving space, which is bounded by side walls and a housing bottom, and a second receiving space, which is bounded by side walls and a housing bottom;
   the first and second receiving space are separated from each other by at least one partition;
   there is provided at least a first phase shifter arrangement, situated in the first receiving space, comprising a common terminal and a plurality of antenna-side terminals, wherein each antenna-side terminal of the first phase shifter arrangement is electrically connected directly or indirectly to a first terminal of at least one radiating element;
   there is provided at least a first duplex filter assembly, situated in the second receiving space, wherein the first duplex filter assembly comprises a common terminal and a first TX terminal and a first RX terminal;
   the at least one partition comprises a first opening, wherein the common terminal of the first duplex filter assembly is electrically or electromagnetically connected to the common terminal of the first phase shifter arrangement through the first opening, wherein the first and the second receiving space of the first housing module are accessible through the same side of the first housing module; and the at least one partition is formed by a side wall of the first housing module, wherein the first and the second receiving space are bounded on one side, forming the first opening in the side wall; and the first duplex filter assembly has a damping/transmission function such that:
  a) transmit signals of a transmission band in the at least one first mobile radio band are passed through from the TX terminal to the common terminal; and
  b) receive signals of a reception band in the at least one first mobile radio band are passed through from the common terminal to the RX terminal; and
  a) transmit signals in the at least one first mobile radio band are subjected to a blocking attenuation from the TX terminal to the RX terminal; and
  b) receive signals in the at least one first mobile radio band are subjected to a blocking attenuation from the common terminal to the TX terminal.

2. The mobile radio antenna according to claim 1, characterized by the following features:
  the first phase shifter arrangement comprises a phase shifter, wherein the phase shifter comprises the plurality of antenna-side terminals and wherein the phase shifter comprises a common input terminal;
  there is provided a signal change unit, comprising the common terminal and at least a first output terminal; and
  the at least one first output terminal of the signal change unit is electrically connected to the common input terminal of the phase shifter.

3. The mobile radio antenna according to claim 2, characterized by the following features:
  the phase shifter of the first phase shifter arrangement is a difference phase shifter or a linear phase shifter; and/or
  the signal change unit comprises a matching network.

4. The mobile radio antenna according to claim 1, characterized by the following features:
  the first housing module comprises a third receiving space, which is bounded by side walls and a housing bottom;
  the second and the third receiving space are separated from each other by a further partition;
  there is provided a first low-noise amplifier, which is situated in the third receiving space; and
  the at least one further partition comprises an opening, wherein the first low-noise amplifier is electrically connected by this opening to the RX terminal of the first duplex filter assembly.

5. The mobile radio antenna according to claim 1, characterized by the following features:
  there is provided at least one first power amplifier; and
  the at least one first power amplifier is situated outside the antenna array module and the first housing module and is electrically connected by a cable connection to the TX terminal of the first duplex filter assembly.

6. The mobile radio antenna according to claim 5, characterized by the following features:
  there is provided a radome, which covers at least the plurality of radiating elements; and
  the at least one first power amplifier is arranged interchangeably on the mobile radio antenna, such that a replacement of the at least one first power amplifier can be done without disassembly of the antenna array module or the radome.

7. The mobile radio antenna according to claim 1, characterized by the following features:
  the at least one first duplex filter assembly:
    a) has a cavity design; or
    b) comprises ceramic resonators; or
    c) comprises strip conductors which are arranged on a circuit board or on a metal sheet.

8. The mobile radio antenna according to claim 1, characterized by the following features:
  there is provided at least a second phase shifter arrangement, situated in the first receiving space, comprising a common terminal and a plurality of antenna-side terminals;
  there is provided at least a second duplex filter assembly, situated in the second receiving space, wherein the second duplex filter assembly comprises a common terminal and a first TX terminal and a first RX terminal and wherein the first and the at least one second duplex filter assembly are decoupled from each other; and
  the at least one second duplex filter assembly has a damping/transmission function such that:
    a) transmit signals of a transmission band in at least one second mobile radio band are passed through from the TX terminal to the common terminal; and
    b) receive signals of a reception band in the at least one first second radio band are passed through from the common terminal to the RX terminal; and
    a) transmit signals in the at least one second mobile radio band are subjected to a blocking attenuation from the TX terminal to the RX terminal; and
    b) receive signals in the at least one second mobile radio band are subjected to a blocking attenuation from the common terminal to the TX terminal;
  the at least one partition comprises a second opening, wherein the common terminal of the second duplex filter assembly is electrically or electromagnetically connected to the common terminal of the second phase shifter arrangement through the second opening;
  there is provided a diplex filter assembly situated in the first receiving space;
  the diplex filter assembly comprises a plurality of antenna-side terminals, wherein each antenna-side terminal of the diplex filter assembly is electrically connected to a respective first terminal of at least one radiating element;
  the diplex filter assembly comprises a plurality of first terminals, wherein the antenna-side terminals of the first phase shifter arrangement are electrically connected to a respective first terminal of the diplex filter assembly;
  the diplex filter assembly comprises a plurality of second terminals, wherein the antenna-side terminals of the second phase shifter arrangement are electrically connected to a respective second terminal of the diplex filter assembly; and
  the diplex filter assembly has a damping/transmission function such that:
    a) mobile radio signals in the at least one first mobile radio band are passed through from the antenna-side terminals to the plurality of first terminals; and
    b) mobile radio signals in the at least one second mobile radio band are passed through from the antenna-side terminals to the plurality of second terminals, and
    a) mobile radio signals in the at least one first mobile radio band are subjected to a blocking attenuation from the antenna-side terminals or the plurality of first terminals to the plurality of second terminals; and b) mobile radio signals in the at least one second mobile radio band are subjected to a blocking attenuation from the antenna-side terminals or the plurality of second terminals to the plurality of first terminals.

9. The mobile radio antenna according to claim 8, characterized by the following features:

the diplex filter assembly comprises a plurality of diplex filter modules;

each diplex filter module is arranged on a circuit board and comprises an antenna-side terminal, a first terminal and a second terminal; and between every two diplex filter modules there is arranged a wall segment, which extends away from the housing bottom of the first receiving space and is electrically conducting.

10. The mobile radio antenna according to claim 9, characterized by the following features:

the circuit boards on which the plurality of diplex filter modules of the diplex filter assembly are arranged are joined together at their ends, thereby forming a common circuit board assembly;

the common circuit board assembly comprises recesses between two diplex filter modules, through which the respective wall segments extend;

the first and the second phase shifter arrangement each comprise a phase shifter; and the non-moving parts of the respective phase shifter of the first and the second phase shifter arrangement are situated on the common circuit board assembly.

11. The mobile radio antenna according to claim 1, characterized by the following features:

there is provided a cover assembly;

the cover assembly encloses the first receiving space of the first housing module and the second receiving space of the first housing module; and the cover assembly comprises tuning elements, which can be introduced from outside the first housing module into the second receiving space to serve for the tuning of the first duplex filter assembly.

12. The mobile radio antenna according to claim 1, characterized by the following feature:

the plurality of radiating elements are broadband radiators and are designed to send and receive mobile radio signals in at least two non-overlapping mobile radio bands.

13. The mobile radio antenna according to claim 1, characterized by the following features:

the first and the second receiving space of the first housing module are accessible through opposite sides of the first housing module; and the at least one partition is formed by the housing bottom of the first housing module, wherein the housing bottom bounds the first and the second receiving space on one side, forming the at least one first opening in the housing bottom.

14. The mobile radio antenna according to claim 1, characterized by the following features:

the antenna array module comprises a second housing module;

the second housing module comprises a first receiving space and a second receiving space;

there is provided at least one first phase shifter arrangement, situated in the first receiving space of the second housing module; and there is provided at least one first duplex filter assembly, situated in the second receiving space of the second housing module.

15. The mobile radio antenna according to claim 14, characterized by the following features:

the first receiving space of the second housing module is bounded by side walls and a housing bottom;

the second receiving space of the second housing module is bounded by side walls and a housing bottom;

the first and the second receiving space of the second housing module are separated from each other by at least one partition;

the at least one first phase shifter arrangement of the second housing module comprises a common terminal and a plurality of antenna-side terminals, each antenna-side terminal of the first phase shifter arrangement of the second housing module being electrically connected directly or indirectly to a second terminal of at least one radiating element;

the at least one first duplex filter assembly of the second housing module comprises a common terminal, a first TX terminal and a first RX terminal;

the at least one partition of the second housing module comprises a first opening, and the common terminal of the first duplex filter assembly of the second housing module is electrically or electromagnetically connected to the common terminal of the first phase shifter arrangement of the second housing module through the first opening of the second housing module; and the first duplex filter assembly of the second housing module has a damping/transmission function such that:

a) transmit signals of a transmission band in the at least one first mobile radio band are passed through from the TX terminal to the common terminal; and b) receive signals of a reception band in the at least one first mobile radio band are passed through from the common terminal to the RX terminal; and a) transmit signals in the at least one first mobile radio band are subjected to a blocking attenuation from the TX terminal to the RX terminal; and b) receive signals in the at least one first mobile radio band are subjected to a blocking attenuation from the common terminal to the TX terminal.

16. The mobile radio antenna according to claim 14, characterized by the following feature:

the plurality of radiating elements are designed to send and receive mobile radio signals in two polarisation planes, wherein a first polarisation of the mobile radio signal can be established and received at the first terminal of the plurality of radiating elements and wherein a second polarisation of the mobile radio signal can be established and received at the second terminal of the plurality of radiating elements.

17. The mobile radio antenna according to claim 14, characterized by the following feature:

the first housing module and the second housing module are a single piece.

18. The mobile radio antenna according to claim 17, characterized by the following feature:

the first receiving space of the first housing module and the first receiving space of the second housing module have the same side wall; and/or the second receiving space of the first housing module and the second receiving space of the second housing module have the same side wall.

19. The mobile radio antenna according to claim 1, characterized by the following features:
- the housing module comprises a first and a second housing half;
- the first housing half comprises a housing bottom and side walls, by which the first receiving space is enclosed;
- the second housing half comprises a housing bottom and side walls, by which the second receiving space is enclosed;
- the first and the second housing half are placed one on the other, so that the end faces of the side walls of the first and the second housing half are oriented toward each other;
- the first phase shifter arrangement comprises a common circuit board assembly, wherein a first side of the common circuit board assembly is covered predominantly or entirely with a metal layer;
- the common circuit board assembly closes off the second receiving space, the first side pointing in the direction of the second receiving space; and
- the at least one partition is formed by the metal layer of the second side of the common circuit board assembly, the first opening passing through the common circuit board assembly.

20. A mobile radio antenna for connection to at least one mobile base station, having the following characteristics:
- there are provided a plurality of radiating elements and a carrier assembly;
- the plurality of radiating elements are arranged on a first side of the carrier assembly and are adapted to sending and receiving mobile radio signals in at least a first mobile radio band;
- there is provided an antenna array module, arranged on a second side of the carrier assembly, the antenna array module comprising at least a first housing module;
- the first housing module comprises a first receiving space, which is bounded by side walls and a housing bottom, and a second receiving space, which is bounded by side walls and a housing bottom;
- the first and second receiving space are separated from each other by at least one partition;
- there is provided at least a first phase shifter arrangement, situated in the first receiving space, comprising a common terminal and a plurality of antenna-side terminals, wherein each antenna-side terminal of the first phase shifter arrangement is electrically connected directly or indirectly to a first terminal of at least one radiating element;
- there is provided at least a first duplex filter assembly, situated in the second receiving space, wherein the first duplex filter assembly comprises a common terminal and a first TX terminal and a first RX terminal;
- the at least one partition comprises a first opening, wherein the common terminal of the first duplex filter assembly is electrically or electromagnetically connected to the common terminal of the first phase shifter arrangement through the first opening; and
- the first duplex filter assembly has a damping/transmission function such that:
  - c) transmit signals of a transmission band in the at least one first mobile radio band are passed through from the TX terminal to the common terminal; and
  - d) receive signals of a reception band in the at least one first mobile radio band are passed through from the common terminal to the RX terminal; and
  - c) transmit signals in the at least one first mobile radio band are subjected to a blocking attenuation from the TX terminal to the RX terminal; and
  - d) receive signals in the at least one first mobile radio band are subjected to a blocking attenuation from the common terminal to the TX terminal, wherein
- the housing module comprises a first and a second housing half;
- the first housing half comprises a housing bottom and side walls, by which the first receiving space is enclosed;
- the second housing half comprises a housing bottom and side walls, by which the second receiving space is enclosed;
- the first and the second housing half are placed one on the other, so that the end faces of the side walls of the first and the second housing half are oriented toward each other;
- the first phase shifter arrangement comprises a common circuit board assembly, wherein a first side of the common circuit board assembly is covered predominantly or entirely with a metal layer;
- the common circuit board assembly closes off the second receiving space, the first side pointing in the direction of the second receiving space; and
- the at least one partition is formed by the metal layer of the second side of the common circuit board assembly, the first opening passing through the common circuit board assembly.

* * * * *